US011868061B2

(12) United States Patent
(10) Patent No.: US 11,868,061 B2
(45) **Date of Patent: *Jan. 9, 2024**

Yanagihara et al.

(54) IMAGE FORMING APPARATUS TO SUPPRESS UNNECESSARY EXPOSURE OF PHOTOCONDUCTIVE BODY

(71) Applicant: BROTHER KOGYO KABUSHIKI KAISHA, Nagoya (JP)

(72) Inventors: Sota Yanagihara, Nagoya (JP); Yusuke Ikegami, Nagoya (JP); Kotaro Haruta, Yokkaichi (JP); Shoichiro Nishimura, Yokkaichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/052,648

(22) Filed: Nov. 4, 2022

(65) Prior Publication Data

US 2023/0070918 A1 Mar. 9, 2023

Related U.S. Application Data

(63) Continuation of application No. 17/192,414, filed on Mar. 4, 2021, now Pat. No. 11,500,302.

(30) Foreign Application Priority Data

Mar. 9, 2020 (JP) ................................ 2020-039699

(51) Int. Cl.

| | |
|---|---|
| ***G03G 15/043*** | (2006.01) |
| ***G03G 21/18*** | (2006.01) |
| ***G03G 15/04*** | (2006.01) |

(52) U.S. Cl.

CPC ..... *G03G 15/043* (2013.01); *G03G 15/04036* (2013.01); *G03G 21/1832* (2013.01); *G03G 2215/08* (2013.01); *G03G 2221/1609* (2013.01)

(58) Field of Classification Search

CPC .......... G03G 15/043; G03G 15/04036; G03G 15/0896; G03G 15/50; G03G 21/1666;

(Continued)

(56) References Cited

U.S. PATENT DOCUMENTS

| | | | | |
|---|---|---|---|---|
| 8,909,089 B2 * | 12/2014 | Kim .................. | G03G 21/1825 399/98 |
| 10,859,940 B2 | 12/2020 | Saeki et al. | |

(Continued)

FOREIGN PATENT DOCUMENTS

| | | |
|---|---|---|
| JP | H096151 A | 1/1997 |
| JP | 2008046548 A | 2/2008 |

(Continued)

*Primary Examiner* — Carla J Therrien

(74) *Attorney, Agent, or Firm* — Merchant & Gould P.C.

(57) ABSTRACT

An image forming apparatus includes a photoconductive body, a light source, a deflector to deflect a light beam from the light source, a scanning optical system to image the deflected light beam onto the photoconductive body, a developing unit to supply developer to the photoconductive body, an optical sensor to detect the deflected light beam, a moving mechanism to move the developing unit to a first position and to a second position, and a controller configured to start driving the deflector, when the developing unit is in the second position, the light source to emit the light beam, thereby obtaining a detection signal of the light beam from the optical sensor, and after obtaining the detection signal of the light beam from the optical sensor, control the moving mechanism to move the developing unit to the first position.

17 Claims, 9 Drawing Sheets

(58) Field of Classification Search

CPC ........... G03G 21/1671; G03G 21/1832; G03G 2215/08; G03G 2221/1609; G03G 2221/1612

See application file for complete search history.

(56) References Cited

U.S. PATENT DOCUMENTS

| | | | | |
|---|---|---|---|---|
| 11,163,258 | B2 | 11/2021 | Sano et al. | |
| 2008/0049094 | A1 | 2/2008 | Kato et al. | |
| 2008/0286001 | A1 | 11/2008 | Matsumoto et al. | |
| 2010/0135694 | A1* | 6/2010 | Hashimoto ........ | G03G 21/1619 399/111 |
| 2012/0020699 | A1 | 1/2012 | Kamimura | |
| 2012/0251179 | A1 | 10/2012 | Suzuki et al. | |
| 2015/0145938 | A1 | 5/2015 | Nagao | |
| 2015/0227110 | A1 | 8/2015 | Yoshimura et al. | |
| 2015/0355590 | A1 | 12/2015 | Tamagaki et al. | |
| 2015/0370219 | A1* | 12/2015 | Ogino ................ | G03G 21/1676 399/110 |
| 2019/0137904 | A1 | 5/2019 | Jung et al. | |
| 2020/0301335 | A1 | 9/2020 | Saeki et al. | |
| 2020/0301345 | A1 | 9/2020 | Suzuki | |
| 2020/0301350 | A1 | 9/2020 | Sakaguchi et al. | |
| 2020/0310281 | A1 | 10/2020 | Haruta et al. | |
| 2020/0333727 | A1 | 10/2020 | Sakaguchi et al. | |
| 2021/0011416 | A1 | 1/2021 | Sakaguchi et al. | |
| 2021/0011427 | A1 | 1/2021 | Saeki et al. | |
| 2021/0080857 | A1 | 3/2021 | Saeki et al. | |
| 2021/0141327 | A1 | 5/2021 | Ikegami et al. | |
| 2021/0165365 | A1 | 6/2021 | Haruta et al. | |
| 2021/0200135 | A1 | 7/2021 | Ikegami et al. | |

FOREIGN PATENT DOCUMENTS

| | | |
|---|---|---|
| JP | 2014067005 A | 4/2014 |
| JP | 2014168907 A | 9/2014 |

* cited by examiner

IMAGE FORMING APPARATUS TO SUPPRESS UNNECESSARY EXPOSURE OF PHOTOCONDUCTIVE BODY

CROSS-REFERENCE TO RELATED APPLICATION

This application is a continuation of U.S. patent application Ser. No. 17/192,414, filed Mar. 4, 2021, now U.S. Pat. No. 11,500,302, which claims priority under 35 U.S.C. § 119 from Japanese Patent Application No. 2020-039699 filed on Mar. 9, 2020. The entire subject matter of the applications is incorporated herein by reference.

BACKGROUND

Technical Field

Aspects of the present disclosure are related to an image forming apparatus to an image forming apparatus to suppress unnecessary exposure of a photoconductive body.

Related Art

An image forming apparatus has been known that includes a photoconductive body, a semiconductor laser, a polygon mirror, a scanning optical system, and a developing device. The semiconductor laser is configured to emit a laser beam. The polygon mirror is configured to deflect the laser beam emitted by the semiconductor laser. The scanning optical system, including an fθ lens, is configured to image the laser beam deflected by the polygon mirror onto the photoconductive body. The developing device includes a developing sleeve configured to supply toner to the photoconductive body.

The image forming apparatus further includes an optical detector, a solenoid, and a controller. The optical detector is configured to detect the laser beam deflected by the polygon mirror. The solenoid is configured to move the developing device to a position where the developing sleeve is in contact with the photoconductive body and a position where the developing sleeve is separated from the photoconductive body. The controller is configured to control the semiconductor laser, the polygon mirror, the developing device, and the solenoid, and obtain a result of detection of the laser beam by the optical detector.

In the image forming apparatus, prior to a copy operation of copying a first page in a single job, the controller performs synchronous detection writing, i.e., starts driving the polygon mirror, causes the semiconductor laser to emit the laser beam, and performs synchronous detection of the laser beam by the optical detector.

Here, since the photoconductive body is exposed, for a single line, to the laser beam emitted in the synchronous detection writing, a line latent image is formed on the photoconductive body. Therefore, the controller controls the solenoid to separate the developing device from the photoconductive body before the synchronous detection writing and to bring the developing sleeve of the developing device into contact with the photoconductive body after the synchronous detection writing, thereby preventing toner from being supplied to the line latent image.

SUMMARY

However, in the known image forming apparatus, the photoconductive body is unnecessarily exposed to the laser beam emitted in the synchronous detection writing. As a result, in the image forming apparatus, it is difficult to suppress, for instance, optical fatigue of a photosensitive layer due to the unnecessary exposure, as well as generation of a ghost image due to a history of the unnecessary exposure.

Aspects of the present disclosure are advantageous to provide one or more improved techniques for an image forming apparatus that make it possible to suppress unnecessary exposure of a photoconductive body.

According to aspects of the present disclosure, an image forming apparatus is provided, which includes a photoconductive body, a light source configured to emit a light beam, a deflector configured to deflect the light beam emitted by the light source, a scanning optical system configured to image the light beam deflected by the deflector onto the photoconductive body, a developing unit including a developing roller configured to supply developer to the photoconductive body, an optical sensor configured to detect the light beam deflected by the deflector, a moving mechanism configured to move the developing unit to a first position where an optical path of the light beam from the scanning optical system to the photoconductive body is opened, and to a second position where the optical path is closed, and a controller. The controller is configured to start driving the deflector, when the developing unit is in the second position, cause the light source to emit the light beam, thereby obtaining a detection signal of the light beam from the optical sensor, and after obtaining the detection signal of the light beam from the optical sensor, control the moving mechanism to move the developing unit to the first position.

According to aspects of the present disclosure, further provided is an image forming apparatus that includes a first photoconductive body, a second photoconductive body, a first light source configured to emit a first light beam, a second light source configured to emit a second light beam, a deflector configured to deflect the first light beam emitted by the first light source and the second light beam emitted by the second light source, a scanning optical system configured to image the first light beam deflected by the deflector onto the first photoconductive body, and image the second light beam deflected by the deflector onto the second photoconductive body, a first developing unit including a first developing roller configured to supply developer to the first photoconductive body, a second developing unit including a second developing roller configured to supply developer to the second photoconductive body, an optical sensor configured to detect the first light beam deflected by the deflector, a moving mechanism configured to move the second developing unit to a first position where an optical path of the first light beam from the scanning optical system to the first photoconductive body is opened, and to a second position where the optical path is closed, and a controller. The controller is configured to start driving the deflector, when the second developing unit is in the second position, cause the first light source to emit the first light beam, thereby obtaining a detection signal of the first light beam from the optical sensor, and after obtaining the detection signal of the first light beam from the optical sensor, control the moving mechanism to move the second developing unit to the first position.

BRIEF DESCRIPTION OF THE ACCOMPANYING DRAWINGS

Figure 4:
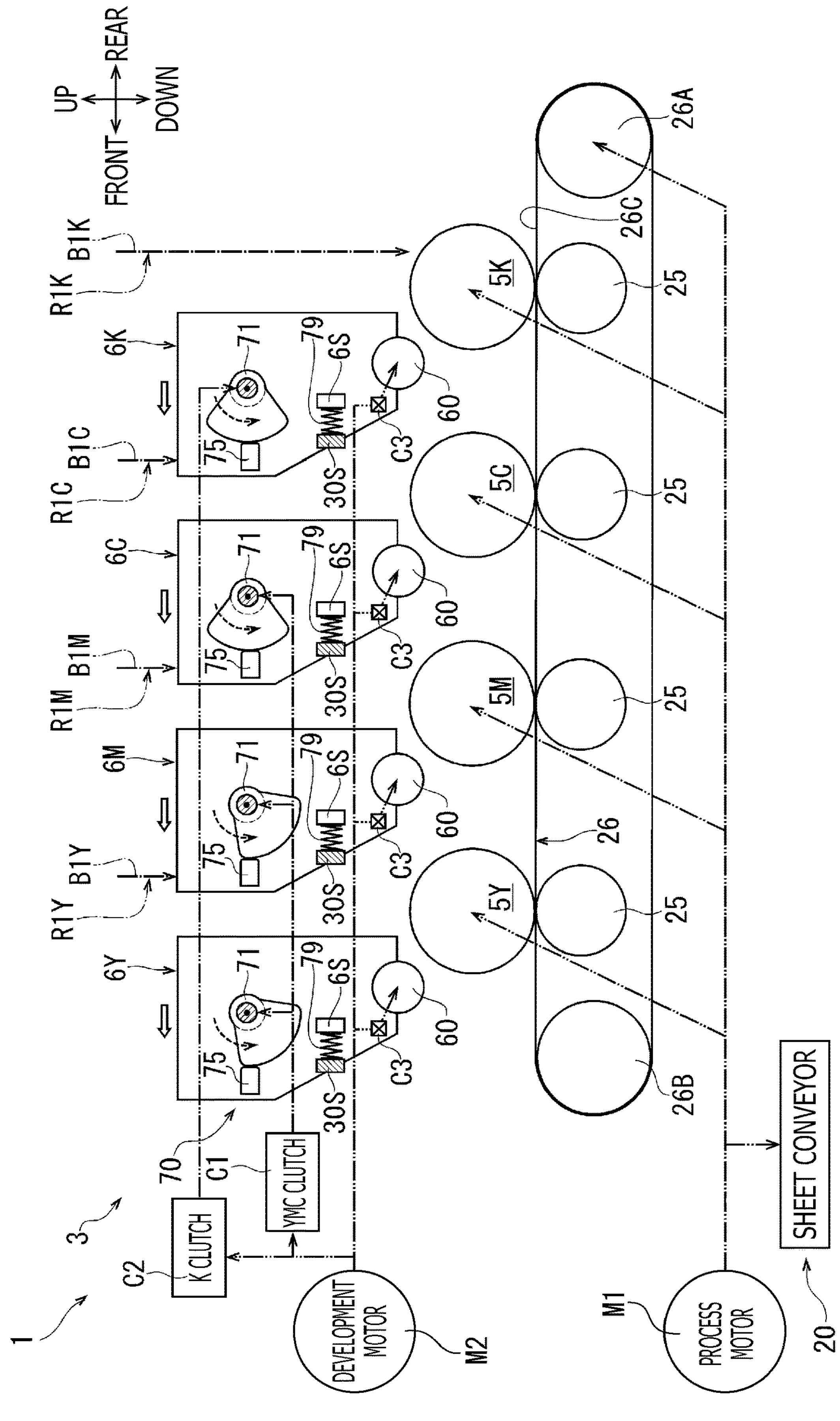

FIG. 4 schematically shows a state in which all developing units have been moved by a moving mechanism to their respective separated positions where a developing roller of each developing unit is separated from a corresponding one of the photoconductive bodies, in the first illustrative embodiment according to one or more aspects of the present disclosure.

Figure 5:
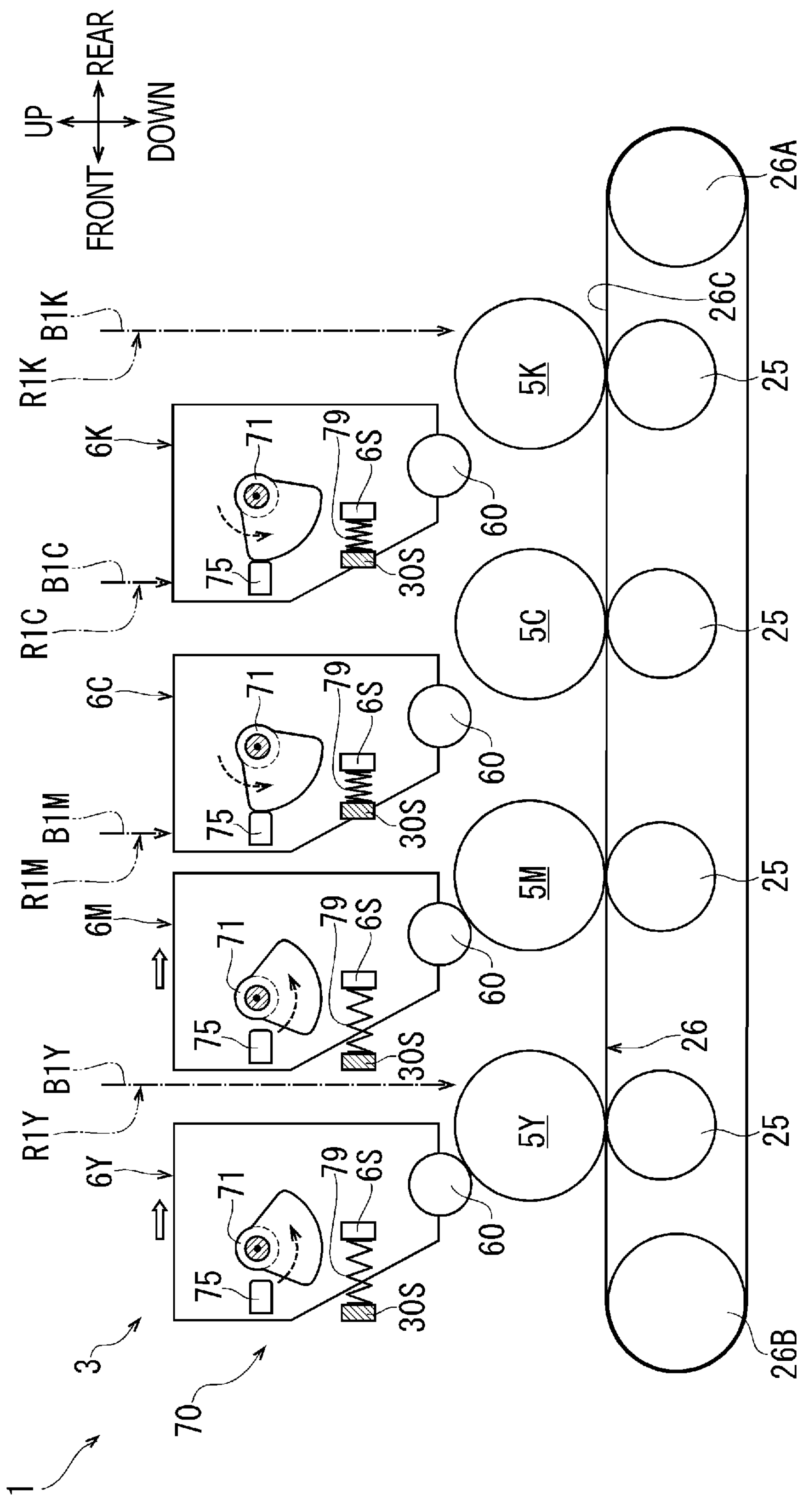

FIG. 5 schematically shows a state in which two developing units have been moved to their respective contact positions where the developing rollers of the two developing units are in contact with the respective corresponding photoconductive bodies, before the other two developing units begin to be moved to their respective contact positions, in the first illustrative embodiment according to one or more aspects of the present disclosure.

Figure 6:
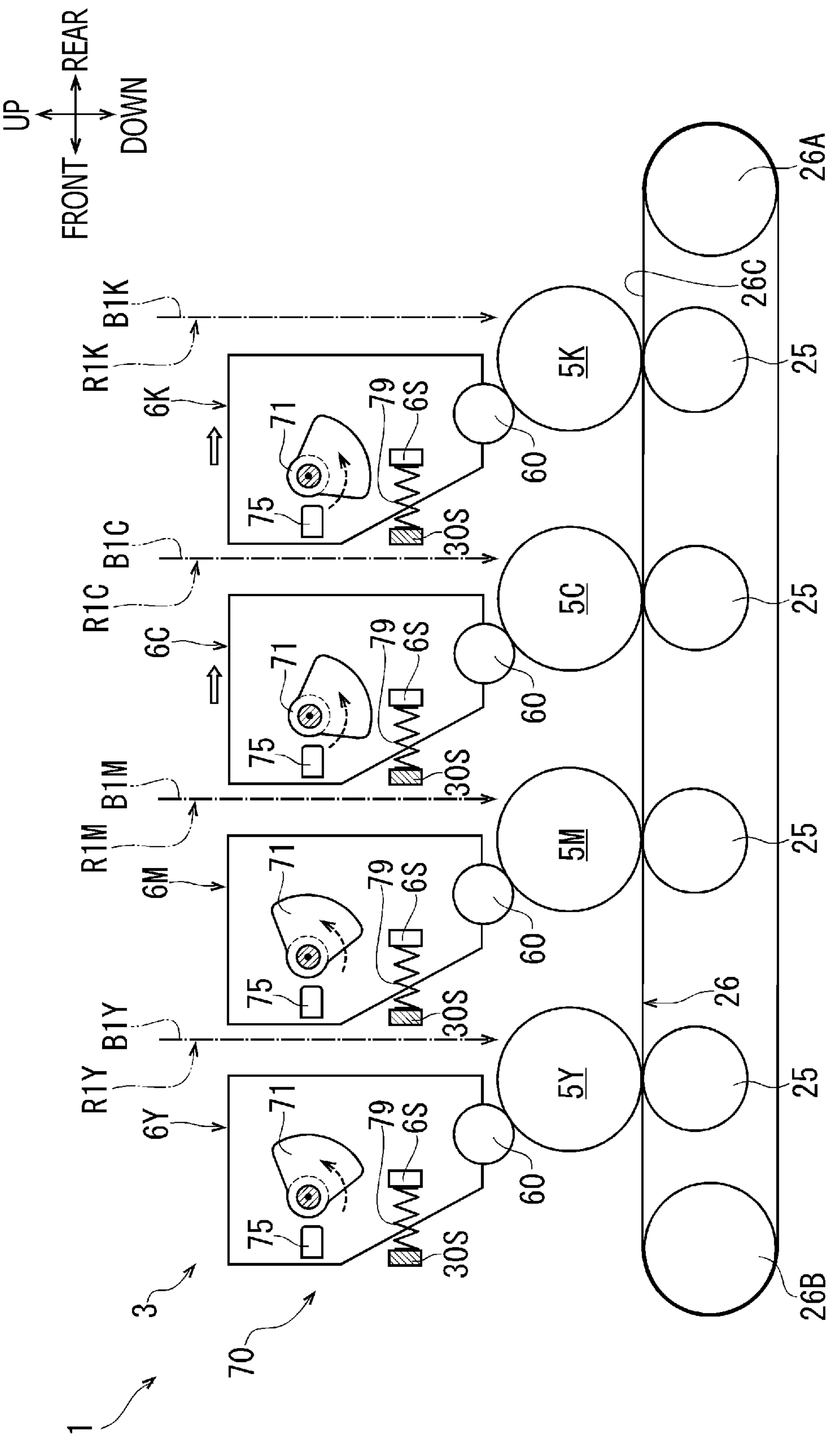

FIG. 6 schematically shows a state in which all the developing units have been moved to their respective separated positions, in the first illustrative embodiment according to one or more aspects of the present disclosure.

Figure 7:
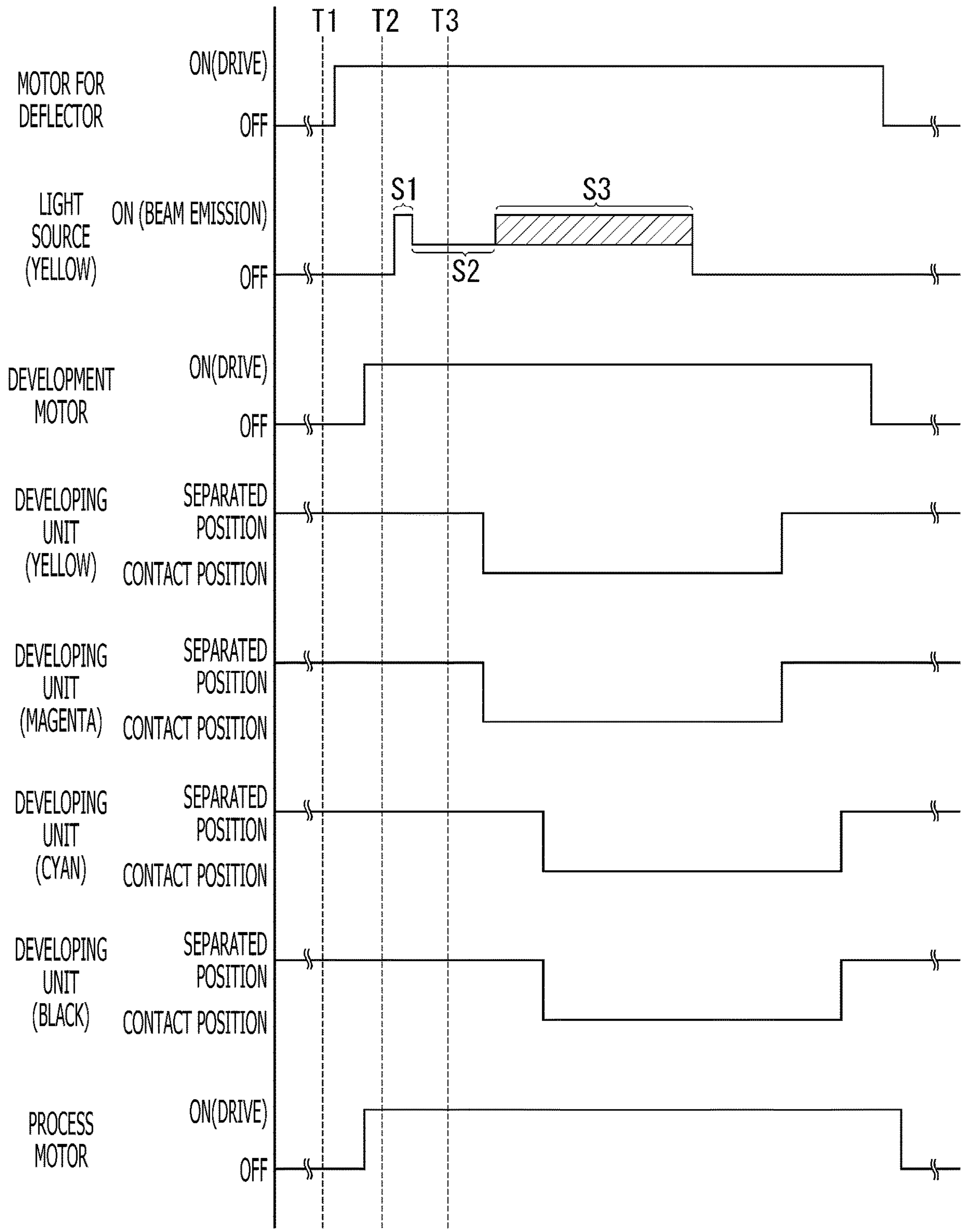

FIG. 7 is a time chart showing a timing for synchronous detection before an image forming operation is started and a timing for the image forming operation after the synchronous detection is completed, in the first illustrative embodiment according to one or more aspects of the present disclosure.

Figure 8:
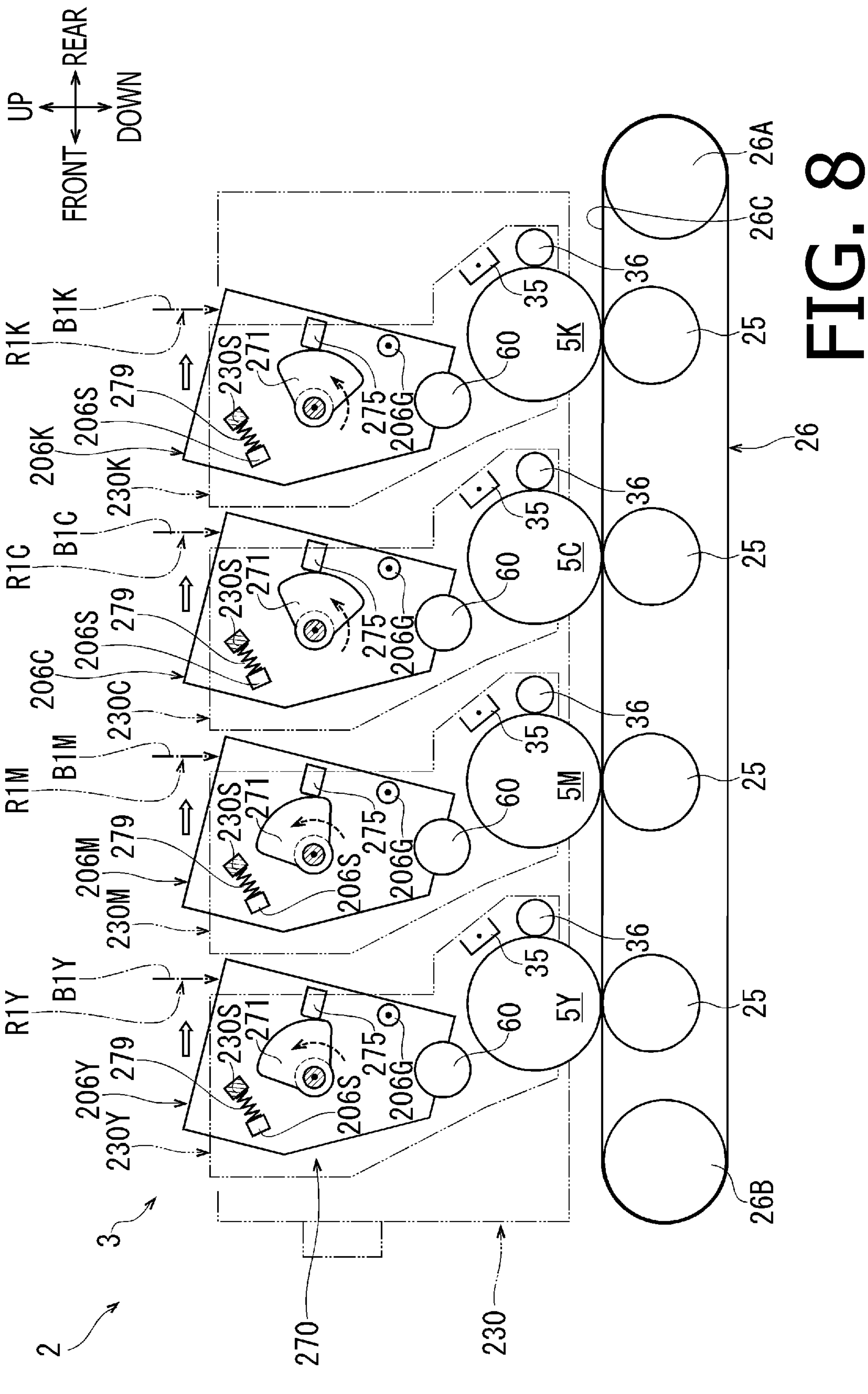

FIG. 8 schematically shows a state in which all developing units have been moved by a moving mechanism to their respective separated positions where a developing roller of each developing unit is separated from a corresponding one of the photoconductive bodies, in a second illustrative embodiment according to one or more aspects of the present disclosure.

Figure 9:
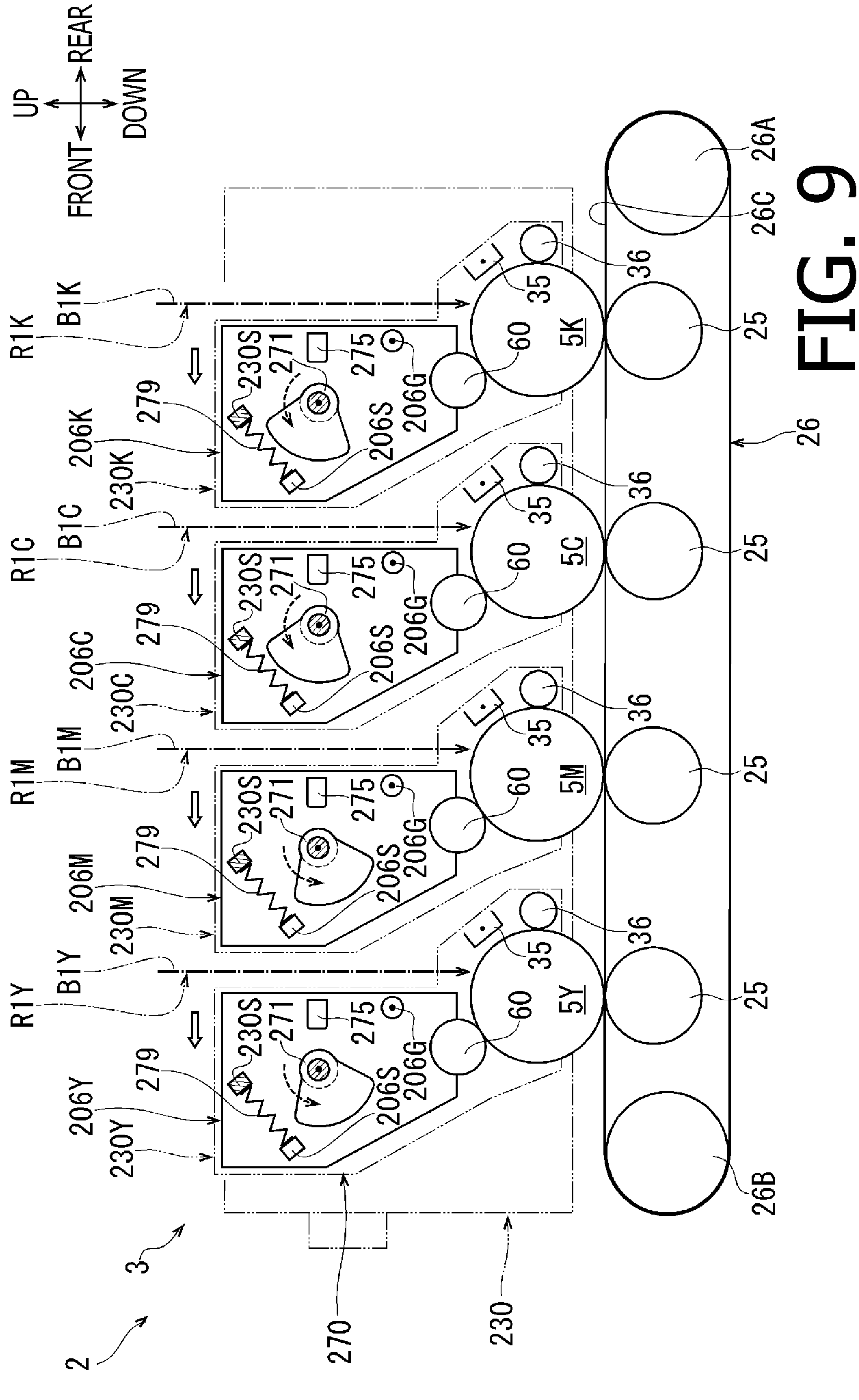

FIG. 9 schematically shows a state in which all the developing units have been moved to their respective contact positions where the developing roller of each developing unit is in contact with the corresponding photoconductive body, in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like. Hereinafter, illustrative embodiments according to aspects of the present disclosure will be described with reference to the accompanying drawings.

First Illustrative Embodiment

Figure 1:
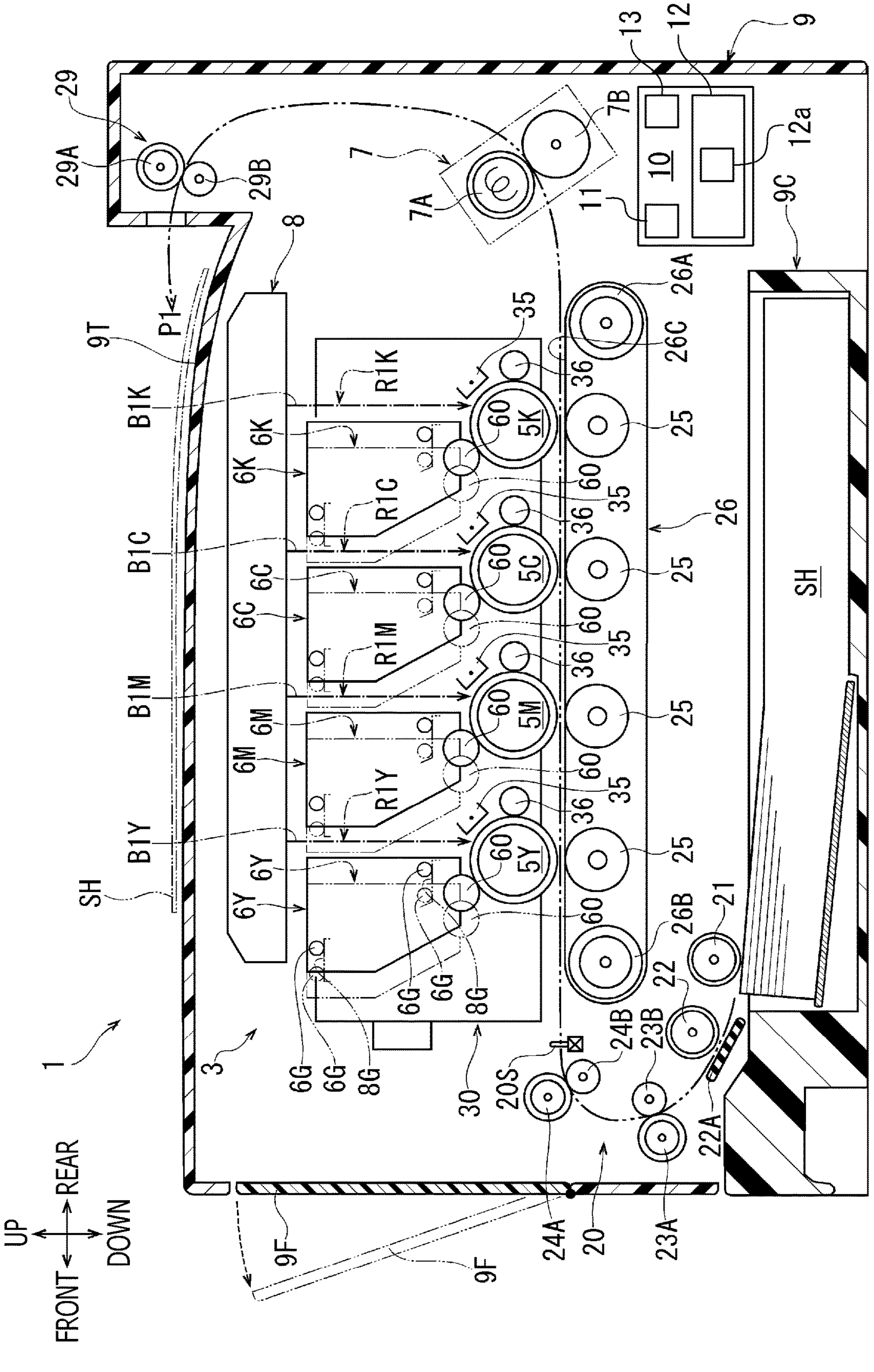
FIG. 1 is a cross-sectional side view schematically showing a configuration of an image forming apparatus in a first illustrative embodiment according to one or more aspects of the present disclosure.

As shown in FIG. 1, an image forming apparatus 1 of a first illustrative embodiment is a laser printer configured to electro-photographically form an image on a sheet SH. It is noted that an upper side, a lower side, a front side, and a rear side of the image forming apparatus 1 will be defined as shown in relevant drawings including FIG. 1.

<Overall Configuration>

As shown in FIG. 1, the image forming apparatus 1 includes a housing 9, a sheet tray 9C, a controller 10, a sheet conveyor 20, an image forming engine 3, a fuser 7, and a sheet discharger 29.

The housing 9 is formed substantially in a box shape, and has a plurality of frame members (not shown) therein. The sheet tray 9C is disposed at a lower portion of the housing 9. The sheet tray 9C is configured to store a plurality of sheets SH stacked thereon. A discharge tray 9T is disposed on an upper surface of the housing 9. Onto the discharge tray 9T, a sheet SH with an image formed thereon is discharged. The sheet conveyor 20 is disposed at a front portion of the housing 9. The sheet conveyor 20 is configured to convey the sheets SH stored in the sheet tray 9C to the image forming engine 3. The fuser 7 is disposed at a rear portion of the housing 9. The fuser 7 is configured to heat and press the sheet SH that has passed through the image forming engine 3.

Inside the housing 9, a conveyance path P1 is formed. The conveyance path P1 is a substantially S-shaped path that extends upward from a front end portion of the sheet tray 9C so as to be curved in a U-shape, then extends rearward substantially in a horizontal direction, and further extends upward to the discharge tray 9T so as to be curved in a U-shape at the rear portion of the housing 9.

<Controller>

The controller 10 includes arithmetic elements such as a CPU 11, a ROM 12, and a RAM 13, and hardware elements (not shown) for controlling semiconductor lasers and motors. The ROM 12 stores programs 12*a* executable by the CPU 11 to control various operations of the image forming apparatus 1 and to perform identification processing. The RAM 13 is used as a storage area to temporarily store data and signals used when the CPU 11 executes the above programs 12*a*, or is used as a work area for data processing.

The controller 10 is configured to control the whole of the image forming apparatus 1 that includes the sheet conveyor 20, the image forming engine 3, the fuser 7, and the sheet discharger 29. Specifically, for instance, the controller 10 is configured to control light sources 4Y, 4M, 4C, and 4K and a motor 89M of a deflector 89 (see FIGS. 2 and 3), also control a process motor M1 and a development motor M2 (see FIG. 4), and obtain results of detection by an optical sensor 8S (i.e., receive detection signals from the optical sensor 8S) (see FIGS. 2 and 3). The controller 10 may control those elements included in the image forming apparatus 1 by executing the programs 12*a* stored in the ROM 12 by the CPU 11.

<Sheet Conveyor>

As shown in FIG. 1, the sheet conveyor 20 feeds the sheets SH stored in the sheet tray 9C into the conveyance path P1, on a sheet-by-sheet basis, by a pickup roller 21, a separation roller 22, and a separation pad 22A. Then, the sheet conveyor 20 conveys the separated sheet SH toward the image forming engine 3 by a first conveyance roller 23A and a first pinch roller 23B, and a second conveyance roller 24A and a second pinch roller 24B. The first conveyance roller 23A, the first pinch roller 23B, the second conveyance roller 24A, and the second pinch roller 24B are disposed along a front U-turn section of the conveyance path P1.

<Image Forming Engine>

The image forming engine 3 is located above the sheet tray 9C in the enclosure 9. The sheet SH, conveyed by the sheet conveyor 20, passes through the image forming engine 3 on a substantially horizontally extending section of the conveyance path P1.

The image forming engine 3 is a direct transfer type color electrophotographic print engine. The image forming engine 3 includes a drawer 30, photoconductive bodies 5Y, 5M, 5C, and 5K, developing units 6Y, 6M, 6C, and 6K, a conveying belt 26, four transfer rollers 25, and a scanner unit 8.

Each of the photoconductive bodies 5Y, 5M, 5C, and 5K is a cylindrical rotating body extending in a rotational axis direction of each photoconductive body, and has a positively-chargeable photosensitive layer formed on its surface. The photoconductive bodies 5Y, 5M, 5C, and 5K are disposed in line along an arrangement direction. The arrangement direction is a direction of a common tangent line of the photoconductive bodies 5Y, 5M, 5C, and 5K, and corresponds to a front-rear direction in the image forming apparatus 1.

<Drawer, Photoconductive Bodies, and Developing Units>

The drawer 30 is a frame-shaped body. Specifically, the drawer 30 includes two side walls that are disposed on both sides of the photoconductive bodies 5Y, 5M, 5C, and 5K in the rotational axis direction, respectively, and extend in the arrangement direction. Further, the drawer 30 includes a front wall that extends in the rotational axis direction and connects one ends of the two side walls in the arrangement direction with each other. Furthermore, the drawer 30 includes a rear wall that extends in the rotational axis direction and connects the other ends of the two side walls in the arrangement direction with each other. The drawer 30 is configured to be pulled out from the housing 9 and expose the developing units 6Y, 6M, 6C, and 6K to the outside of the housing 9.

The photoconductive bodies 5Y, 5M, 5C, and 5K correspond to developer of four colors, i.e., yellow, magenta, cyan, and black, respectively. The photoconductive bodies 5Y, 5M, 5C, and 5K are rotatably supported by the drawer 30 in series in the above-cited order from an upstream side to a downstream side of the conveyance path P1.

Four chargers 35 and four photoconductive body cleaners 36, corresponding to the photoconductive bodies 5Y, 5M, 5C, and 5K, respectively, are supported by the drawer 30. Each charger 35 faces the surface of a corresponding one of the photoconductive bodies 5Y, 5M, 5C, and 5K from an upper rear side of the corresponding photoconductive body 5Y, 5M, 5C, or 5K. Each photoconductive body cleaner 36 is in contact with the surface of a corresponding one of the photoconductive bodies 5Y, 5M, 5C, and 5K from behind.

The developing units 6Y, 6M, 6C, and 6K correspond to the developer of the four colors, i.e., yellow, magenta, cyan, and black, respectively. Each of the developing units 6Y, 6M, 6C, and 6K stores therein the developer of a corresponding color. The developer is a positively-chargeable dry toner. A developing roller 60 is rotatably supported at a lower end portion of each of the developing units 6Y, 6M, 6C, and 6K.

The developing unit 6Y is detachably supported by the drawer 30 at a location that is above and displaced forward from the photoconductive body 5Y. The developing unit 6M is detachably supported by the drawer 30 at a location that is above and displaced forward from the photoconductive body 5M. The developing unit 6C is detachably supported by the drawer 30 at a location that is above and displaced forward from the photoconductive body 5C. The developing unit 6K is detachably supported by the drawer 30 at a location that is above and displaced forward from the photoconductive body 5K.

By opening a front cover 9F disposed at a front end portion of the housing 9 and pulling the drawer 30 forward to expose the developing units 6Y, 6M, 6C, and 6K to the outside of the housing 9, the individual developing units 6Y, 6M, 6C, and 6K may be replaced.

Each of the developing units 6Y, 6M, 6C, and 6K is movable to a contact position indicated by a solid line in FIG. 1 and to a separated position indicated by an alternate long and two short dashes line in FIG. 1 by operation of a below-mentioned moving mechanism 70.

A plurality of guide convex portions 6G are formed on both sides of each of the developing units 6Y, 6M, 6C, and 6K in the rotational axial direction. Each guide convex portion 6G protrudes toward a corresponding one of the two side walls that are located on both the sides of the drawer 30 in the rotational axial direction, respectively. A plurality of guide surfaces 8G are formed on the two side walls of the drawer 30. Each guide surface 8G extends horizontally in the front-rear direction and contacts a corresponding one of the guide convex portions 6G from below. Each of the developing units 6Y, 6M, 6C, and 6K is configured to move along the front-rear direction between the contact position (see the solid line in FIG. 1) and the separated position (see the alternate long and two short dashes line in FIG. 1) while making the guide convex portions 6G thereof slide on the corresponding guide surfaces 8G.

When each of the developing units 6Y, 6M, 6C, and 6K is in the contact position indicated by the solid line in FIG. 1, each developing roller 60 is in contact with a corresponding one of the photoconductive bodies 5Y, 5M, 5C, and 5K. In this state, each developing roller 60 is allowed to supply the developer to the corresponding one of the photoconductive bodies 5Y, 5M, 5C, and 5K.

When each of the developing units 6Y, 6M, 6C, and 6K is in the separated position (see the alternate long and two short dashes line in FIG. 1), the developing roller 60 thereof is separated from the corresponding one of the photoconductive bodies 5Y, 5M, 5C, and 5K.

<Conveying Belt and Transfer Rollers>

The conveying belt 26 and the four transfer rollers 25 are disposed beneath the substantially horizontally extending section of the conveyance path P1 along the arrangement direction. The conveying belt 26 is a circulating endless belt wound around a driving roller 26A disposed at a rear side in the housing 9 and a driven roller 26B disposed at a front side in the housing 9.

Of surfaces of the conveying belt 26, an upward-facing plane extending along the conveyance path P1 between the driving roller 26A and the driven roller 26B may be referred to as a "conveying surface 26C." The conveying surface 26C faces the photoconductive bodies 5Y, 5M, 5C, and 5K from below.

Each transfer roller 25 is disposed inside a space surrounded by the conveying belt 26, to pinch the conveying belt 26 between each transfer roller 25 and a corresponding one of the photoconductive bodies 5Y, 5M, 5C, and 5K. A negative voltage is applied to the conveying surface 26C via each transfer roller 25.

As shown in FIG. 4, the pickup roller 21, the separation roller 22, the first conveyance roller 23A, the second conveyance roller 24A, the driving roller 26A for driving the conveying belt 26, and the photoconductive bodies 5Y, 5M, 5C, and 5K are synchronously rotated by a driving force transmitted thereto from the process motor M1 controlled by the controller 10.

As shown in FIG. 1, the sheet SH, fed by the sheet conveyor 20 and having reached the image forming engine 3, passes under the photoconductive bodies 5Y, 5M, 5C, and 5K by being conveyed while being adsorbed on the conveying surface 26C.

<Scanner Unit>

Figure 2:
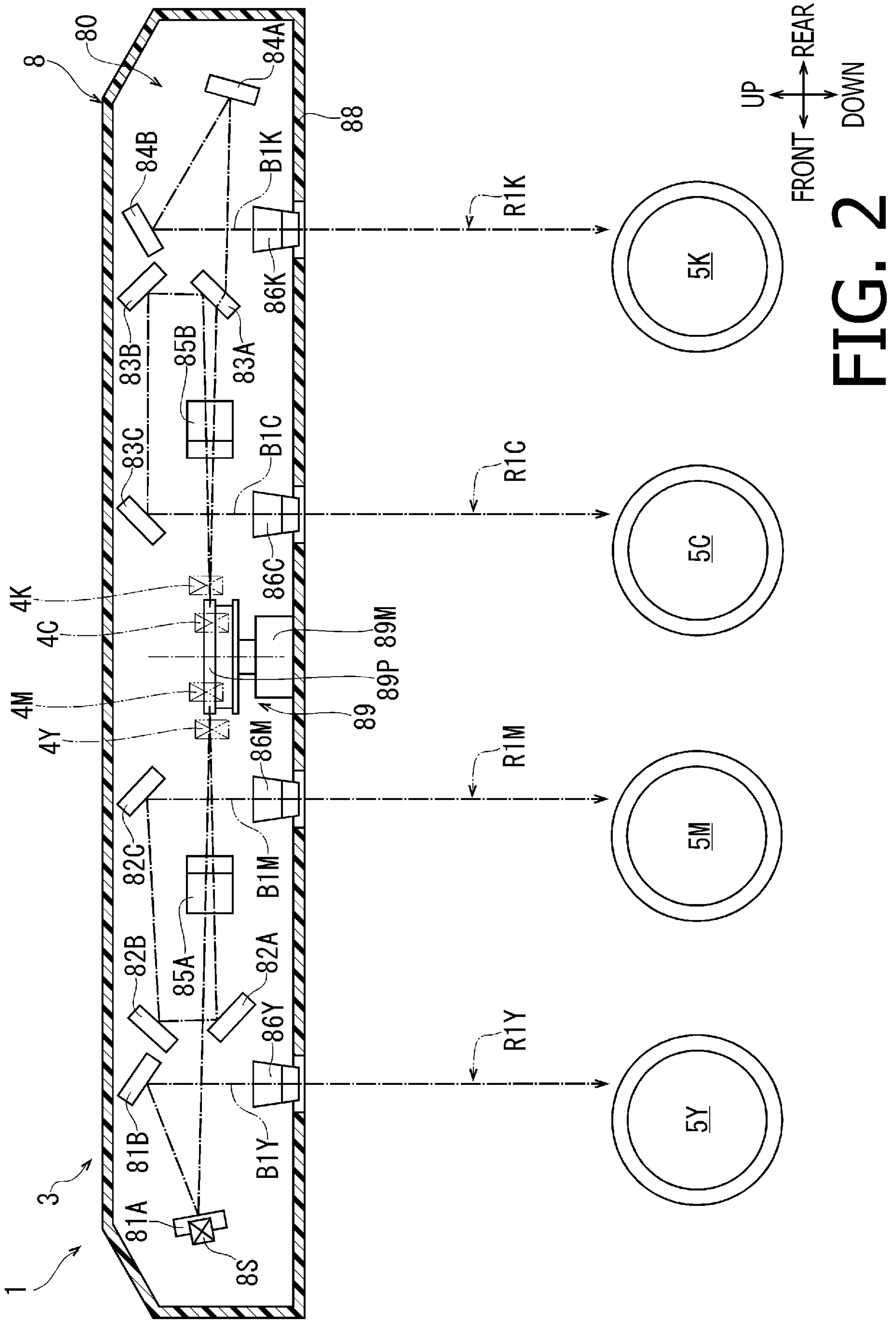
FIG. 2 is a cross-sectional side view schematically showing a relative positional relationship among photoconductive bodies, light sources, a deflector, a scanning optical system, and an optical sensor included in the image forming apparatus in the first illustrative embodiment according to one or more aspects of the present disclosure.

As shown in FIG. 2, the scanner unit 8 is located above the photoconductive bodies 5Y, 5M, 5C, and 5K and the developing units 6Y, 6M, 6C, and 6K in the housing 9. The scanner unit 8 includes a housing 88, a deflector 89, light sources 4Y, 4M, 4C, and 4K, a scanning optical system 80, and an optical sensor 8S. The housing 88 is formed substantially in a flattened box shape, and accommodates the deflector 89, the light sources 4Y, 4M, 4C, and 4K, the scanning optical system 80, and the optical sensor 8S.

Figure 3:
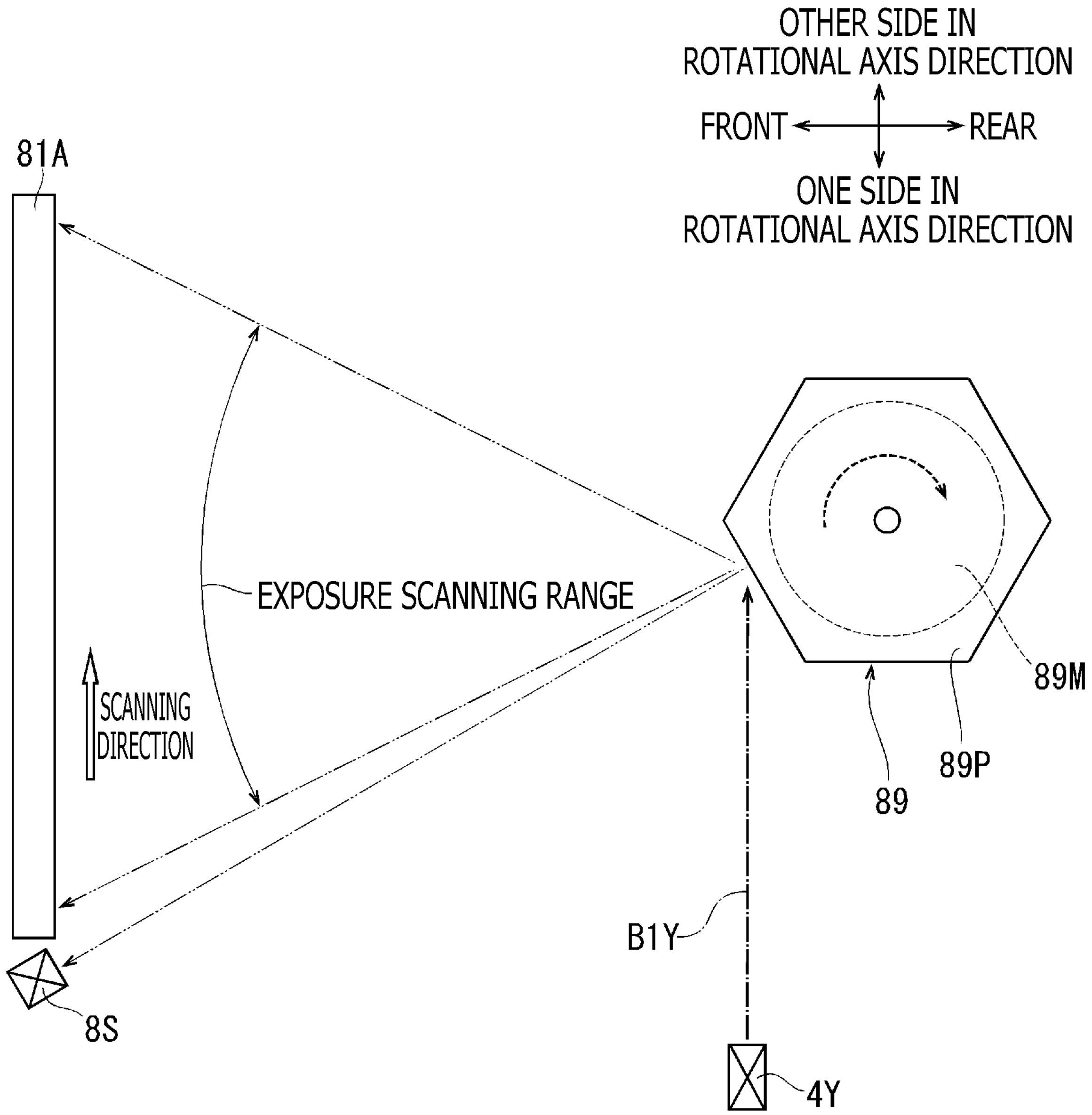
FIG. 3 is a plan view schematically showing a relative positional relationship among a light source for yellow, a polygon mirror of the deflector, the optical sensor, and an exposure scanning range, in the first illustrative embodiment according to one or more aspects of the present disclosure.

As shown in FIGS. 2 and 3, the deflector 89 includes a motor 89M and a polygon mirror 89P. The motor 89M is located on a central portion of a bottom wall of the housing 88. The motor 89M has a drive shaft projecting upward. The polygon mirror 89P is fixed to the drive shaft of the motor 89M. The polygon mirror 89P is driven by the motor 89M, to rotate integrally with the drive shaft.

The controller 10 controls the motor 89M to drive and rotate the polygon mirror 89P at a particular constant rotational speed. The timing to start driving and rotating the polygon mirror 89P of the deflector 89 will be described later.

The light sources 4Y, 4M, 4C, and 4K are provided for the four colors (i.e., yellow, magenta, cyan, and black) of developer, respectively. As schematically shown in FIG. 2, each of the light sources 4Y, 4M, 4C, and 4K is a known laser light source that includes a semiconductor laser to emit laser light and a coupling lens to convert the laser light into a light beam.

As shown in FIG. 3, the light source 4Y is disposed on one side in the rotational axis direction of the photoconductive bodies 5Y, 5M, 5C, and 5K with respect to the polygon mirror 89P in the housing 88. Although the light sources 4M, 4C, and 4K are not shown in FIG. 3, the light sources 4M, 4C, and 4K are also disposed on the said one side in the rotational axis direction with respect to the polygon mirror 89P in the housing 88, in substantially the same manner as the light source 4Y.

As shown in FIGS. 2 and 3, the light source 4Y emits a light beam B1Y toward the polygon mirror 89P of the deflector 89. The deflector 89 deflects the light beam B1Y emitted by the light source 4Y, by the polygon mirror 89P in a forward-facing and gently upward inclined direction, and scans the light beam B1Y in a scanning direction from the one side to the other side in the rotational axis direction.

As shown in FIG. 2, the light source 4M emits a light beam B1M toward the polygon mirror 89P of the deflector 89. The deflector 89 deflects the light beam B1M emitted by the light source 4M, by the polygon mirror 89P in a forward-facing and gently downward inclined direction, and scans the light beam B1M in the scanning direction from the one side to the other side in the rotational axis direction.

The light source 4C emits a light beam B1C toward the polygon mirror 89P of the deflector 89. The deflector 89 deflects the light beam B1C emitted by the light source 4C, by the polygon mirror 89P in a rearward-facing and gently upward inclined direction, and scans the light beam B1C in a scanning direction from the other side to the one side in the rotational axis direction.

The light source 4K emits a light beam B1K toward the polygon mirror 89P of the deflector 89. The deflector 89 deflects the light beam B1K emitted by the light source 4K, by the polygon mirror 89P in a rearward-facing and gently downward inclined direction, and scans the light beam B1K in the scanning direction from the other side to the one side in the rotational axis direction.

The scanning optical system 80 includes first scanning lenses 85A and 85B, second scanning lenses 86Y, 86M, 86C, and 86K and mirrors 81A, 81B, 82A, 82B, 82C, 83A, 83B, 83C, 84A, and 84B.

The first scanning lens 85A is disposed forward of the polygon mirror 89P. The first scanning lens 85B is disposed rearward of the polygon mirror 89P.

The second scanning lens 86Y is disposed to face the photoconductive body 5Y from above via an opening formed to penetrate a portion, located above the photoconductive body 5Y, of the bottom wall of the housing 88. Similarly, the second scanning lens 86M is disposed to face the photoconductive body 5M from above via an opening formed to penetrate a portion, located above the photoconductive body 5M, of the bottom wall of the housing 88. Further, similarly, the second scanning lens 86C is disposed to face the photoconductive body 5C from above via an opening formed to penetrate a portion, located above the photoconductive body 5C, of the bottom wall of the housing 88. Furthermore, similarly, the second scanning lens 86K is disposed to face the photoconductive body 5K from above via an opening formed to penetrate a portion, located above the photoconductive body 5K, of the bottom wall of the housing 88.

The mirrors 81A and 81B reflect the light beam B1Y that has passed through the first scanning lens 85A and guide the light beam B1Y to the second scanning lens 86Y. Thus, the photoconductive body 5Y is irradiated with the light beam B1Y that has passed through the second scanning lens 86Y.

At this time, the first scanning lens 85A and the second scanning lens 86Y convert the light beam B1Y scanned at a constant angular velocity by the polygon mirror 89P in such a manner that the light beam B1Y is scanned at a constant linear velocity on the surface of the photoconductive body 5Y, thereby imaging the light beam B1Y on the surface of the photoconductive body 5Y.

The mirrors 82A, 82B, and 82C reflect the light beam B1M that has passed through the first scanning lens 85A and guide the light beam B1M to the second scanning lens 86M. Thus, the photoconductive body 5M is irradiated with the light beam B1M that has passed through the second scanning lens 86M.

The mirrors 83A, 83B, and 83C reflect the light beam B1C that has passed through the first scanning lens 85B and guide the light beam B1C to the second scanning lens 86C. Thus, the photoconductive body 5C is irradiated with the light beam B1C that has passed through the second scanning lens 86C.

The mirrors 84A and 84B reflect the light beam B1K that has passed through the first scanning lens 85B and the mirror 83A, and guide the light beam B1K to the second scanning lens 86K. Thus, the photoconductive body 5K is irradiated with the light beam B1K that has passed through the second scanning lens 86K.

The conversion of each of the light beams B1M, B1C, and B1K by a corresponding one of the first scanning lenses 85A and 85B and a corresponding one of the second scanning lenses 86M, 86C, and 86K produces substantially the same effects as the conversion of the light beam B1Y by the first scanning lens 85A and the second scanning lens 86Y.

Thus, the scanning optical system 80 is configured to image the light beams B1Y, B1M, B and B1K deflected by the deflector 89 on the surfaces of the photoconductive bodies 5Y, 5M, 5C, and 5K, respectively.

An optical path of the light beam B1Y from the second scanning lens 86Y of the scanning optical system 80 to the photoconductive body 5Y will be referred to as an “optical path R1Y.”

An optical path of the light beam B1M from the second scanning lens 86M of the scanning optical system 80 to the photoconductive body 5M will be referred to as an “optical path R1M.” An optical path of the light beam B1C from the second scanning lens 86C of the scanning optical system 80 to the photoconductive body 5C will be referred to as an “optical path R1C.” An optical path of the light beam B1K from the second scanning lens 86K of the scanning optical system 80 to the photoconductive body 5K will be referred to as an “optical path R1K.”

The optical sensor 8S is a synchronous detection sensor used by the controller 10 to control the light sources 4Y, 4M, 4C, and 4K to form electrostatic latent images on the photoconductive bodies 5Y, 5M, 5C, and 5K, respectively. As shown in FIG. 3, the optical sensor 8S is disposed on the one side in the rotational axis direction with respect to the mirror 81A. A scanning range, in which the light beam B1Y is scanned in the scanning direction from the one side to the other side in the rotational axis direction so as to expose the photoconductive body 5Y to the light beam B1Y reflected by the mirror 81A, will be referred to as an “exposure scanning range.”

The optical sensor 8S is disposed in a position to detect the light beam B1Y, deflected by the polygon mirror 89P of the deflector 89 and scanned in the scanning direction, at an upstream side of the exposure scanning range in the scanning direction.

When the scanner unit 8 is activated to form the electrostatic latent images on the photoconductive bodies 5Y, 5M, 5C, and 5K, a relationship between a rotational phase of the polygon mirror 89P and the position of the optical sensor 8S is unknown. Therefore, as will be described later, the controller 10 controls the light source 4Y to emit the light beam B1Y such that the light beam B1Y is scanned at least once and obtains the timing when the optical sensor 8S detects the beam B1Y, thereby performing synchronous detection.

<Fuser>

As shown in FIG. 1, the fusing unit 7 is disposed rearward of the drawer 30 and the conveying belt 26, i.e., downstream of the image forming engine 3 in a sheet conveyance direction along the conveyance path P1. The fuser 7 includes a heating roller 7A and a pressure roller 7B. The heating roller 7A is disposed on an upper side with respect to the conveyance path P1. The pressure roller 7B is disposed to face the heating roller 7A from below across the conveyance path P1.

The heating roller 7A is driven to rotate by a drive motor (not shown). The fuser 7 is configured to heat and pressurize the sheet SH that has passed through the image forming engine 3 by pinching the sheet SH between the heating roller 7A and the pressure roller 7B.

<Sheet Discharger>

The sheet discharger 29 includes a discharge roller 29A and a discharge pinch roller 29P. The discharge roller 29A and the discharge pinch roller 29P are disposed at an upper portion of a rear U-turn section of the conveyance path P1, i.e., at a most downstream section of the conveyance path P1.

The discharge roller 29A is driven to rotate by a drive motor (not shown). The discharge roller 29A and the discharge pinch roller 29P are configured to nip therebetween the sheet SH that has passed through the fuser 7 and discharge the sheet SH onto the discharge tray 9T.

<Moving Mechanism>

As shown in FIGS. 4 to 6, the image forming apparatus 1 includes the moving mechanism 70. The moving mechanism 70 includes four cams 71 corresponding to the developing units 6Y, 6M, 6C, and 6K, respectively. Further, the image forming apparatus 1 includes four compression coil springs 79. The four compression coil springs 79 press the developing units 6Y, 6M, 6C, and 6K toward the photoconductive bodies 5Y, 5M, 5C, and 5K, respectively. Each of the developing units 6Y, 6M, 6C, and 6K has a pressed member 75 configured to be pressed by the moving mechanism 70.

Although another set of the same cam 71, the same pressed member 75, and the same compression coil spring 79 for each of the developing units 6Y, 6M, 6C, and 6K is provided on the other side in the rotational axis direction with respect to each developing unit, the said another set is not shown in any of the drawings, and an explanation thereof is omitted.

<Configuration for Moving the Developing Unit for Yellow>

As shown in FIG. 4, the convex pressed member 75 is formed at a front end portion of a side surface, on the one side in the rotational axis direction, of the developing unit 6Y. A convex spring receiver 6S is formed at a portion lower than and rearward of the pressed member 7, of the side surface, on the one side in the rotational axis direction, of the developing unit 6Y.

A spring receiver 30S is disposed at a location forward of the spring receiver 6S of the developing unit 6Y, of a side wall, on the one side in the rotational axis direction, of the drawer 30. The compression coil spring 79, with one end locked by the spring receiver 30S, is held by the drawer 30. The compression coil spring 79 is compressed and deformed with the other end in contact with the spring receiver 6S. The compression coil spring 79 is configured to press the developing unit 6Y in such a direction that the developing roller 60 moves toward the photoconductive body 5Y.

The compression coil spring 79 may be configured to be held by the developing unit 6Y with one end locked by the spring receiver 6S and to be compressed and deformed with the other end in contact with the spring receiver 30S.

A cam 71 is rotatably supported at a location rearward of the pressed member 75 of the developing unit 6Y, of the side wall, on the one side in the rotational axis direction, of the drawer 30.

As shown in FIGS. 4 to 6, the cam 71 is configured to rotate in a counterclockwise direction on the surface (hereinafter referred to as the “drawing surface”) of the said figures, as a driving force from the development motor M2 controlled by the controller 10 is transmitted intermittently in response to connection and disconnection of a YMC clutch C1.

In the developing unit 6Y, the cam 71 rotates in the counterclockwise direction on the drawing surface as shown in FIG. 4, thereby bringing an arc portion of the fan shape into contact with the pressed member 75 and pushing the developing unit 6Y forward. As a result, the moving mechanism 70 moves the developing unit 6Y against the pressing force from the compression coil spring 79 to the separated position, where the developing roller 60 is separated away from the photoconductive body 5Y.

The cam 71 rotates in the counterclockwise direction on the drawing surface as shown in FIG. 5 from the state shown in FIG. 4, thereby separating the arc portion of the fan shape from the pressed member 75. As a result, the moving mechanism 70 moves the developing unit 6Y by the pressing force from the compression coil spring 79 to the contact position, where the developing roller 60 is brought into contact with the photoconductive body 5Y. Then, when the cam 71 further rotates in the counterclockwise direction on the drawing surface as shown in FIG. 6, the cam 71 maintains the developing unit 6Y in the contact position as long as the arc portion of the fan shape is separated away from the pressed member 75. As described above, in the first illustrative embodiment, each cam 71 is configured to rotate. However, each cam 71 may be configured to move linearly.

As shown in FIG. 4, four developing roller connection mechanisms C3 are provided on respective transmission pathways for transmitting the driving force from the development motor M2 to the four developing rollers 60.

Each developing roller connection mechanism C3 is a passive mechanism configured to switch a state of a corresponding one of the transmission pathways between a connected state and a cut-off state, in mechanical conjunction with the movement of a corresponding one of the developing units 6Y, 6M, 6C, and 6K between the contact position and the separated position.

When the photoconductive body 5Y is driven to rotate while the developing unit 6Y is in the separated position, the developing roller 60 of the developing unit 6Y is not rotated since the transmission of the driving force from the development motor M2 controlled by the controller 10 is cut off by the developing roller connection mechanism C3. On the other hand, as shown in FIG. 6, when the photoconductive body 5Y is driven to rotate while the developing unit 6Y is in the contact position, the developing roller 60 of the developing unit 6Y is rotated in synchronization with the photoconductive body 5Y since the driving force from the development motor M2 controlled by the controller 10 is transmitted via the developing roller connection mechanism C3. The respective developing rollers 60 of the developing units 6M, 6C and 6K operate in substantially the same manner as the developing roller 60 of the developing unit 6Y.

<Configuration for Moving the Developing Unit for Magenta>

As shown in FIGS. 4 to 6, the cam 71, the pressed member 75, and the compression coil spring 79 for the developing unit 6M have substantially the same configurations as the cam 71, the pressed member 75, and the compression coil spring 79 for the developing unit 6Y. A rotational phase of the cam 71 for the developing unit 6M is substantially the same as the rotational phase of the cam 71 for the developing unit 6Y.

In the developing unit 6M, the cam 71 rotates in the counterclockwise direction on the drawing surface as shown in FIG. 4, thereby bringing the arc portion of the fan shape into contact with the pressed member 75 and pushing the developing unit 6M forward. As a result, the moving mechanism 70 moves the developing unit 6M against the pressing force from the compression coil spring 79 to the separated position where the developing roller 60 is separated away from the photoconductive body 5M.

The cam 71 rotates in the counterclockwise direction on the drawing surface as shown in FIG. 5 from the state shown in FIG. 4, thereby separating the arc portion of the fan shape from the pressed member 75. As a result, the moving mechanism 70 moves the developing unit 6M by the pressing force from the compression coil spring 79 to the contact position where the developing roller 60 is brought into contact with the photoconductive body 5M. Then, when the cam 71 further rotates in the counterclockwise direction on the drawing surface as shown in FIG. 6, the cam 71 maintains the developing unit 6M in the contact position as long as the arc portion of the fan shape is separated away from the pressed member 75.

The rotational phases of the respective cams 71 for the developing units 6Y and 6M are substantially the same as each other. Thus, the moving mechanism 70 is configured to move the developing units 6Y and 6M to the respective separated positions simultaneously, and move the developing units 6Y and 6M to the respective contact positions simultaneously.

When the developing unit 6M is in the contact position shown in FIGS. 5 and 6, an upper wall of the developing unit 6M is located rearward of the optical path R1Y so as to open the optical path R1Y. On the other hand, when the developing unit 6M is in the separated position shown in FIG. 4, the upper wall of the developing unit 6M is located to close the optical path R1Y.

<Configuration for Moving the Developing Unit for Cyan>

As shown in FIGS. 4 to 6, the cam 71, the pressed member 75, and the compression coil spring 79 for the developing unit 6C have substantially the same configurations as the cams 71, the pressed members 75, and the compression coil springs 79 for the developing units 6Y and 6M. However, the rotational phase of the cam 71 for the developing unit 6C is shifted by about 45 degrees, in a clockwise direction on the drawing surface as shown in FIGS. 4 to 6, out of the rotational phase of the respective cams 71 for the developing units 6Y and 6M.

In the developing unit 6C, the cam 71 rotates in the counterclockwise direction on the drawing surface as shown in FIG. 4, thereby bringing the arc portion of the fan shape into contact with the pressed member 75 and pushing the developing unit 6C forward. As a result, the moving mechanism 70 moves the developing unit 6C against the pressing force from the compression coil spring 79 to the separated position where the developing roller 60 is separated away from the photoconductive body 5C.

When the cam 71 rotates in the counterclockwise direction on the drawing surface as shown in FIG. 5 from the state shown in FIG. 4, the cam 71 maintains the developing unit 6C in the separated position as long as the arc portion of the fan shape is in contact with the pressed member 75. Then, the cam 71 further rotates in the counterclockwise direction on the drawing surface as shown in FIG. 6, thereby separating the arc portion of the fan shape from the pressed member 75. Thereby, the moving mechanism 70 moves the developing unit 6C by the pressing force from the compression coil spring 79 to the contact position where the developing roller 60 is brought into contact with the photoconductive body 5C.

The rotational phase of the cam 71 for the developing unit 6C is shifted, in the clockwise direction on the drawing surface as shown in FIGS. 4 to 6, out of the rotational phase of the respective cams 71 for the developing units 6Y and 6M. Therefore, the developing unit 6C is moved by the moving mechanism 70 to the contact position and the separated position later than the developing units 6Y and 6M.

When the developing unit 6C is in the contact position shown in FIG. 6, the upper wall of the developing unit 6C is located rearward of the optical path R1M so as to open the optical path R1M. On the other hand, when the developing unit 6C is in the separated position shown in FIGS. 4 and 5, the upper wall of the developing unit 6C is located to close the optical path R1M.

<Configuration for Moving the Developing Unit for Black>

As shown in FIGS. 4 to 6, the cam 71, the pressed member 75, and the compression coil spring 79 for the developing unit 6K have substantially the same configurations as the cams 71, the pressed members 75, and the compression coil springs 79 for the developing units 6Y, 6M, and 6C.

However, the cam 71 for the developing unit 6K is configured to rotate in the counterclockwise direction on the drawing surface of FIGS. 4 to 6, as the driving force from the development motor M2 controlled by the controller 10 is transmitted intermittently in response to connection and disconnection of a K clutch C2.

To form a color image on the sheet SH, the cam 71 for the developing unit 6K is configured to rotate in synchronization with the respective cams 71 for the developing units 6Y, 6M, and 6C. In this case, the rotational phase of the cam 71 for the developing unit 6K is substantially the same as the rotational phase of the cam 71 for the developing unit 6C.

To form a monochrome image on the sheet SH, the cam 71 for the developing unit 6K is further configured to rotate alone as the YMC clutch C1 is cut off.

In the developing unit 6K, the cam 71 rotates in the counterclockwise direction on the drawing surface as shown in FIG. 4, thereby bringing the arc portion of the fan shape into contact with the pressed member 75 and pushing the developing unit 6K forward. As a result, the moving mechanism 70 moves the developing unit 6K against the pressing force from the compression coil spring 79 to the separated position where the developing roller 60 is separated from the photoconductive body 5K.

When the cam 71 rotates in the counterclockwise direction on the drawing surface as shown in FIG. 5 from the state shown in FIG. 4, the cam 71 maintains the developing unit 6K in the separated position as long as the arc portion of the fan shape is in contact with the pressed member 75. Then, the cam 71 further rotates in the counterclockwise direction on the drawing surface as shown in FIG. 6, thereby separating the arc portion of the fan shape from the pressed member 75. As a result, the moving mechanism 70 moves the developing unit 6K by the pressing force from the compression coil spring 79 to the contact position where the developing roller 60 is brought into contact with the photoconductor 5K.

In forming a color image on the sheet SH, the rotational phases of the respective cams 71 for the developing units 6C and 6K are substantially the same as each other and are shifted, in the clockwise direction on the drawing surface, out of the rotational phases of the respective cams 71 for the developing units 6Y and 6M. Thereby, the developing unit 6K is moved by the moving mechanism 70 to the contact position and the separated position later than the developing units 6Y and 6M and at substantially the same time as the developing unit 6C.

When the developing unit 6K is in the contact position shown in FIG. 6, the upper wall of the developing unit 6K is located rearward of the optical path R1C so as to open the optical path R1C. On the other hand, when the developing unit 6K is in the separated position shown in FIGS. 4 and 5, the upper wall of the developing unit 6K is located to close the optical path R1C.

<Operations of Moving Mechanism when Image Forming Apparatus is Powered on, or Developing Units are Attached>

When the image forming apparatus 1 is powered on, or the drawer 30 is attached into the housing 9 after replacement of the developing units 6Y, 6M, 6C, and 6K, the controller 10 performs various initial checking operations.

In this case, as shown in FIG. 4, the controller 10 transmits the driving force from the development motor M2 to the four cams 71 via the YMC clutch C1 and the K clutch C2, and rotates the four cams 71 in the counterclockwise direction on the drawing surface of the said figure. As a result, the developing units 6Y, 6M, 6C, and 6K are moved to the respective separated positions. Thereby, the developing unit 6M closes the optical path R1Y, the developing unit 6C closes the optical path R1M, and the developing unit 6K closes the optical path R1C.

Thereafter, the controller 10 places the image forming apparatus 1 in a standby state, and stops the motor 89M and the polygon mirror 89P of the deflector 89. In other words, the controller 10 causes the moving mechanism 70 to move the developing units 6Y, 6M, 6C, and 6K to the respective separated positions by the moving mechanism 70, before beginning to drive the polygon mirror 89P of the deflector 89 to rotate.

In a timing chart shown in FIG. 7, the image forming apparatus 1 is in the standby state until the image forming apparatus 1 receives a command to perform an image forming operation at a timing T1. In the standby state, the motor 89M of the deflector 89 is turned off, so as not to be driven to rotate. The light source 4Y is turned off, so as not to emit the light beam B1Y. The developing motor M2 is turned off, so as not to be driven to rotate. The developing units 6Y, 6M, 6C, and 6K are in the respective separated positions. The process motor M1 is turned off, so as not to be driven to rotate.

<Synchronous Detection before Starting Image Forming Operation>

When receiving a command to perform the image formation operation at the timing T1 shown in FIG. 7, the controller 10 performs synchronous detection to know a relationship between the rotational phase of the polygon mirror 89P and the position of the optical sensor 8S, before starting the image formation operation.

Namely, when the developing units 6Y, 6M, 6C, and 6K are in the respective separated positions, and the optical path R1Y is closed by the developing unit 6M, the controller 10 turns on the motor 89M of the deflector 89 and begins to drive and rotate the polygon mirror 89P.

The controller 10 turns on the process motor M1 and the development motor M2 after a lapse of a particular period of time after turning on the motor 89M of the deflector 89. At this stage, the process motor M1 starts driving the conveying belt 26 and the photoconductive bodies 5Y, 5M, 5C, and 5A. However, the transmission of the driving force from the process motor M1 to the sheet conveyor 20 is cut off by a clutch (not shown). Further, the transmission of the driving force from the development motor M2 to the moving mechanism 70 is cut off by the YMC clutch C1 and the K clutch C2.

Then, at a timing T2 (see FIG. 7) when the rotational speed of the polygon mirror 89P reaches a particular rotational speed for imaging the light beams B1Y, B1M, B1C, and B1K onto the surfaces of the photoconductive bodies 5Y, 5M, 5C, and 5K, the controller 10 controls the motor 89M to maintain the rotational speed of the polygon mirror 89P constant.

Next, in a period S1 shown in FIG. 7, the controller 10 controls the light source 4Y to continuously emit the beam B1Y over an area of a single surface of the polygon mirror 89P including the exposure scanning range (see FIG. 3) and perform at least a single operation of scanning the beam B1Y. Thereby, the controller 10 obtains a timing at which the optical sensor 8S detects the light beam B1Y at the position upstream of the exposure scanning range (see FIG. 3) in the scanning direction. Based on the obtained timing, the controller 10 determines the relationship between the rotational phase of the polygon mirror 89P and the position of the optical sensor 8S, and then completes the synchronous detection.

The light beam B1Y emitted from the light source 4Y during the execution of the synchronous detection is blocked by the developing unit 6M which closes the optical path R1Y, and therefore does not reach the photoconductive body 5Y.

Thereafter, as shown in FIG. 7, the controller 10 controls the light source 4Y to emit the light beam B1Y only in a range, outside the exposure scanning range, which includes a range in which the optical sensor 8S detects the light beam B1Y, in a period S2 before the exposure of the photoconductive body 5Y is started.

<Image Forming Operation>

After completion of the synchronization detection, the controller 10 starts the image forming operation at a timing T3 shown in FIG. 7. Then, the controller 10 sets a clutch (not shown) provided between the process motor M1 and the sheet conveyor 20 into a connected state, and starts conveying the sheet SH by the sheet conveyor 20. In the following description, a case where a color image is formed will be explained. When a monochrome image is formed, only a difference from the case where a color image is formed is that only the developing unit 6K is moved to the contact position. Hence, an explanation of the case where a monochrome image is formed is omitted.

After a lapse of a particular period of time from the timing T3 shown in FIG. 7, the controller 10 transmits the driving force from the development motor M2 to the four cams 71 via the YMC clutch C1 and the K clutch C2, and rotates the four cams 71 in the counterclockwise direction on the drawing surface as shown in FIG. 6 from the state shown in FIG. 4. As a result, the developing units 6Y and 6M move to the respective contact positions. Thus, the developing unit 6M is placed to open the optical path R1Y. Later than the developing units 6Y and 6M, the developing units 6C and 6K move to the respective contact positions. Thus, the developing unit 6C is placed to open the optical path R1M, and the developing unit 6K is placed to open the optical path R1C.

The controller 10 causes the charger 35 to uniformly and positively charge the surfaces of the photoconductive bodies 5Y, 5M, 5C, and 5K which are driven to rotate by the process motor M1.

Next, the controller 10 determines timings at which a leading end of the sheet SH reaches the photoconductive bodies 5Y, 5M, 5C, and 5K, based on a timing at which the leading end of the sheet SH passes a sheet sensor 20S disposed between the sheet tray 9C and the image forming engine 3 in the sheet conveyance direction along the transport path P1 and a conveyance speed for the sheet SH. Based on the determined timings, the controller 10 causes the light sources 4Y, 4M, 4C, and 4K to emit the light beams B1Y, B1M, B1C, and B1K, respectively. During the period S3 for exposing the photoconductive body 5Y, the controller 10 controls the light source 4Y to continuously emit the light beam B1Y in a range in which the light sensor 8S detects the beam B1Y, and to emit the light beam B1Y in a manner modulated in accordance with an image to be formed, in the exposure scanning range.

The light beams B1Y, B1M, B1C, and B1K are imaged on the surfaces of the photoconductive bodies 5Y, 5M, 5C, and 5K via the optical paths R1Y, R1M, R1C, and R1K, respectively. Thereby, an electrostatic latent image corresponding to the image to be formed is formed on the surface of each of the photoconductive bodies 5Y, 5M, 5C, and 5K.

Then, the controller 10 supplies the developer to the electrostatic latent images on the surfaces of the photoconductive bodies 5Y, 5M, 5C, and 5K by the developing rollers 60 of the developing units 6Y, 6M, 6C, and 6K, thereby forming developer images, respectively. Subsequently, the developer images are transferred onto the sheet SH being conveyed while being pinched between the photoconductive bodies 5Y, 5M, 5C, and 5K and the conveying surface 26C of the conveying belt 26, by the conveying surface 26C to which a negative voltage is applied, and the four transfer rollers 25.

Then, the fuser 7 heats and pressurizes the sheet SH that has passed through the image forming engine 3 to fix the developer images transferred to the sheet SH. Afterward, the sheet discharger 29 discharges the sheet SH onto the discharge tray 9T. Thus, the image forming apparatus 1 completes the image forming operation on the sheet SH.

Advantageous Effects

In the image forming apparatus 1 of the first illustrative embodiment, in an attempt to convey a sheet SH placed in the sheet cassette 9C and perform image formation on the sheet SH, the controller 10 begins to drive and rotate the polygon mirror 89P of the deflector 89 and causes the light source 4Y to emit the light beam B1Y, thereby obtaining a result of detection of the light beam B1Y by the optical sensor 8S (i.e., receiving a detection signal from the optical sensor 8S detecting the light beam B1Y). Then, the controller 10 determines the phase of the polygon mirror 89P of the deflector 89 based on the obtained result of detection by the optical sensor 8S, and takes control to form electrostatic latent images on the photoconductive bodies 5Y, 5M, 5C, and 5K.

Here, in the image forming apparatus 1, as shown in FIG. 4, the light source 4Y is caused to emit the light beam B1Y in the state where the upper wall of the developing unit 6M in the separated position closes the optical path R1Y of the light beam B1Y. Thereby, when the light beam B1Y is first made incident on the optical sensor 8S to obtain the result of detection by the optical sensor 8S after the polygon mirror 89P of the deflector 89 begins to be driven to rotate, the light beam B1Y is prevented from reaching the photoconductive body 5Y.

Therefore, the image forming apparatus 1 of the first illustrative embodiment is enabled to suppress unnecessary exposure of the photoconductive body 5Y. As a result, the image forming apparatus 1 is enabled to suppress, for instance, optical fatigue of the photosensitive layer due to the unnecessary exposure, and also suppress, for instance, generation of ghost images due to a history of the unnecessary exposure.

Further, in this image forming apparatus 1, as shown in FIGS. 4 to 6, the moving mechanism 70 performs two switching operations, i.e., an operation of switching between opening and closing of each of the optical paths R1Y, R1M, and R1C, and an operation of switching between a contact state where the developing roller 60 of each of the developing units 6Y, 6M, 6C, and 6K is in contact with a corresponding one of the photoconductive bodies 5Y, 5M, 5C, and 5K, and a separated state where the said developing roller 60 is separated from the corresponding one of the photoconductive bodies 5Y, 5M, 5C, and 5K. Thus, it is possible to reduce the number of parts included in the image forming apparatus 1 and achieve a simplified configuration of the image forming apparatus 1.

Further, in the image forming apparatus 1, before beginning to drive and rotate the polygon mirror 89P of the deflector 89, the controller 10 causes the moving mechanism 70 to move the developing units 6Y, 6M, 6C, and 6K to the respective separated positions shown in FIG. 4, thereby closing the optical path R1Y of the light beam B1Y. Thus, even though the light source 4Y is caused to emit the light beam B1Y immediately after the polygon mirror 89P of the deflector 89 begins to be driven to rotate, the image forming apparatus 1 configured as above is enabled to certainly suppress unnecessary exposure of the photoconductive body 5Y.

Further, the image forming apparatus 1 is configured to move the developing units 6Y, 6M, 6C, and 6K along the front-rear direction, thereby opening and closing the optical paths R1Y, R1M, and R1C. Thereby, it is possible to prevent a storage space of each of the developing units 6Y, 6M, 6C, and 6K from expanding in the vertical direction.

Further, in the image forming apparatus 1, as shown in FIG. 2, the optical sensor 8S is disposed in a position to detect the light beam B1Y deflected by the deflector 89. Namely, even in the image forming apparatus 1 configured to form images of a plurality of colors, only the single optical sensor 8S needs to be provided for the light beam B1Y corresponding to the particular color.

Further, in the image forming apparatus 1, as shown in FIG. 1, the controller 10 causes the sheet conveyor 20 to start conveying the sheet SH, and then causes the moving mechanism 70 to move the developing units 6Y, 6M, 6C, 6K from the respective separated positions indicated by the alternate long and two short dashes lines in FIG. 1 to the respective contact positions indicated by the solid lines in FIG. 1, thereby opening the optical paths R1Y, R1M, and R1C. Then, the controller 10 transfers the developer onto the sheet SH being conveyed by the sheet conveyor 20, by the conveying belt 26 and the four transfer rollers 25. Thereby, the image forming apparatus 1 configured as above is enabled to place the developing units 6Y, 6M, 6C, and 6K in the respective separated positions until just before performing image formation on the sheet SH being conveyed by the sheet conveyor 20, thereby closing the optical path R1Y. Thus, it is possible to certainly suppress unnecessary exposure of the photoconductive body 5Y.

Further, in the image forming apparatus 1, the controller 10 controls the light source 4Y to emit the light beam B1Y after the rotational speed of the polygon mirror 89P of the deflector 89 reaches the particular rotational speed for imaging the light beams B1Y, B1M, B1C, and B1K onto the surfaces of the photoconductive bodies 5Y, 5M, 5C, and 5K. Therefore, it is possible to suppress unnecessary emission of the light beam B1Y from the light source 4Y.

Second Illustrative Embodiment

As shown in FIGS. 8 and 9, an image forming apparatus 2, of a second illustrative embodiment according to aspects of the present disclosure, employs a drawer 230 instead of the drawer 30, for substantially the same image forming engine 3 as in the image forming apparatus 1 of the aforementioned first illustrative embodiment. Process cartridges 230Y, 230M, 230C, and 230K are detachably supported by the drawer 230.

Further, in the image forming apparatus 2, the photoconductive bodies 5Y, 5M, 5C, and 5K, the four chargers 35, and the four photoreceptor cleaners 36, which are supported by the drawer 30 in the aforementioned first illustrative embodiment, are supported by the process cartridges 230Y, 230M, 230C, and 230K, respectively.

Further, in the image forming apparatus 2, developing units 206Y, 206M, 206C, and 206K, a moving mechanism 270, compression coil springs 279, and pressed members 275 are employed instead of the developing units 6Y, 6M, 6C, and 6K, the moving mechanism 70, the compression coil springs 79, and the pressed members 75 in the aforementioned first illustrative embodiment.

In the second illustrative embodiment, the other elements have substantially the same configurations as in the aforementioned first illustrative embodiment. Therefore, with respect to the elements having substantially the same configurations as in the aforementioned first illustrative embodiment, the same reference numerals will be provided thereto, and explanations thereof will be omitted or simplified.

Each of the developing units 206Y, 206M, 206C, and 206K stores therein developer of a corresponding color, in substantially the same manner as the developing units 6Y, 6M, 6C, and 6K in the aforementioned first illustrative embodiment. A developing roller 60 is rotatably supported at a lower end portion of each of the developing units 206Y, 206M, 206C, and 206K.

Rotary members 206G are formed on both side surfaces, in the rotational axis direction, of each of the developing units 206Y, 206M, 206C, 206K. Each rotary member 206G is rotatable around a central axis thereof extending in the said rotational axis direction. Specifically, the rotary members 206G of each of the developing units 206Y, 206M, 206C, and 206K are rotatably supported by two side walls that are respectively disposed on both sides, in the rotational axis direction, of a corresponding one of the process cartridges 230Y, 230M, 230C, and 230K. Thereby, each of the developing units 206Y, 206M, 206C, and 206K is movable (rotatable) between a contact position shown in FIG. 9 and a separated position shown in FIG. 8. Examples of the rotary members 206G may include, but are not limited to, shafts, bosses, and bearing surfaces.

When the developing units 206Y, 206M, 206C, and 206K are in the respective contact positions shown in FIG. 9, each developing roller 60 is in contact with a corresponding one of the photoconductive bodies 5Y, 5M, 5C, and 5K and is enabled to supply the developer to the corresponding photoconductive body.

Meanwhile, when the developing units 206Y, 206M, 206C, and 206K are in the respective separated positions shown in FIG. 8, each developing roller 60 is separated from the corresponding one of the photoconductive bodies 5Y, 5M, 5C, and 5K.

The image forming apparatus 2 includes a moving mechanism 270. The moving mechanism 270 has four cams 271 corresponding to the developing units 206Y, 206M, 206C, and 206K, respectively. Further, the image forming apparatus 2 includes four compression coil springs 279. The four compression coil springs 279 press the developing units 206Y, 206M, 206C, and 206K toward the photoconductive bodies 5Y, 5M, 5C, and 5K, respectively. Each of the developing units 206Y, 206M, 206C, and 206K has a pressed member 275 configured to be pressed by the moving mechanism 270.

Although another set of the same cam 271, the same pressed member 275, and the same compression coil spring 279 for each of the developing units 206Y, 206M, 206C, and 206K is provided on the other side in the rotational axis direction with respect to each developing unit, the said another set is not shown in any of the drawings, and an explanation thereof is omitted.

The convex pressed member 275 is formed at a rear end portion of a side surface, on one side in the rotational axis direction, of the developing unit 206Y. A convex spring receiver 206S is formed at a front end portion of the side surface, on the one side in the rotational axis direction, of the developing unit 206Y.

A spring receiver 230S is disposed at a location rearward of and higher than the spring receiver 206S of the developing unit 206Y, of a side wall, on the one side in the rotational axis direction, of the process cartridge 230Y. The compression coil spring 279 is compressed and deformed with one end locked by the spring receiver 206S and the other end locked by the spring receiver 230S. The compression coil spring 279 is configured to press the developing unit 206Y in such a direction that the developing roller 60 moves toward the photoconductive body 5Y.

A cam 271 is rotatably supported at a location forward of the pressed member 275 of the developing unit 206Y, of the side wall, on the one side in the rotational axis direction, of the process cartridge 230Y.

The cam 271 is configured to rotate in the counterclockwise direction on the drawing surface of FIGS. 8 and 9, as the driving force from the development motor M2 controlled by the controller 10 is transmitted intermittently in response to connection and disconnection of a clutch (not shown).

In the developing unit 206Y, the cam 271 rotates in the counterclockwise direction on the drawing surface as shown in FIG. 8, thereby bringing an arc portion of the fan shape into contact with the pressed member 275 and pushing the developing unit 206Y rearward. As a result, the moving mechanism 70 moves the developing unit 206Y against the pressing force from the compression coil spring 279 to the separated position where the developing roller 60 is separated away from the photoconductive body 5Y.

The cam 271 rotates in the counterclockwise direction on the drawing surface as shown in FIG. 9 from the state shown in FIG. 8, thereby separating the arc portion of the fan shape from the pressed member 275. As a result, the moving mechanism 70 moves (rotates) the developing unit 206Y by the pressing force from the compression coil spring 279 to the contact position, where the developing roller 60 is brought into contact with the photoconductive body 5Y.

When the developing unit 206Y is in the contact position shown in FIG. 9, an upper wall of the developing unit 206Y is located forward of the optical path R1Y, so as to open the optical path R1Y. On the other hand, when the developing unit 206Y is in the separated position shown in FIG. 8, the upper wall of the developing unit 206Y is located to close the light path R1Y.

As shown in FIGS. 8 and 9, the cam 271, the pressed member 275, and the compression coil spring 279 for each of the developing units 206M, 206C, and 206K have substantially the same configurations as the cam 271, the pressed member 275, and the compression coil spring 279 for the developing unit 206Y.

Each of the developing units 206M, 206C, and 206K rotates and moves to the contact position and the separated position when the corresponding cam 271 intermittently rotates in the counterclockwise direction on the drawing surface of FIGS. 8 and 9.

The developing unit 206M opens the optical path R1M when in the contact position shown in FIG. 9. Meanwhile, the developing unit 206M closes the optical path R1M when in the separated position shown in FIG. 8.

The developing unit 206C opens the optical path R1C when in the contact position shown in FIG. 9. Meanwhile, the developing unit 206C closes the optical path R1C when in the separated position shown in FIG. 8.

The developing unit 206K opens the optical path R1K when in the contact position shown in FIG. 9. Meanwhile, the developing unit 206K closes the optical path R1K when in the separated position shown in FIG. 8.

Operations of the moving mechanism 70 when the image forming apparatus 2 is powered on, synchronous detection before an image forming operation is started, and the image forming operation are substantially the same as in the aforementioned first illustrative embodiment. Therefore, explanations of them are omitted.

Advantageous Effects

In the image forming apparatus 2 of the second illustrative embodiment, in an attempt to convey a sheet SH placed in the sheet cassette 9C and perform image formation on the sheet SH, the controller 10 begins to drive and rotate the polygon mirror 89P of the deflector 89 and causes the light source 4Y to emit the light beam B1Y, thereby obtaining a result of detection of the light beam B1Y by the optical sensor 8S (i.e., receiving a detection signal from the optical sensor 8S detecting the light beam B1Y). Then, the controller 10 determines the phase of the polygon mirror 89P of the deflector 89 based on the obtained result of detection by the optical sensor 8S, and takes control to form electrostatic latent images on the photoconductive bodies 5Y, 5M, 5C, and 5K.

Here, in the image forming apparatus 2, as shown in FIG. 8, the light source 4Y is caused to emit the light beam B1Y in the state where the upper wall of the developing unit 206M in the separated position closes the optical path R1Y of the light beam B1Y. Thereby, when the light beam B1Y is first made incident on the optical sensor 8S to obtain the result of detection by the optical sensor 8S after the polygon mirror 89P of the deflector 89 begins to be driven to rotate, the light beam B1Y is prevented from reaching the photoconductive body 5Y.

Therefore, the image forming apparatus 2 of the second illustrative embodiment is enabled to suppress unnecessary exposure of the photoconductive body 5Y, in substantially the same manner as the image forming apparatus 1 of the aforementioned first illustrative embodiment. As a result, the image forming apparatus 2 is enabled to suppress, for instance, optical fatigue of the photosensitive layer due to the unnecessary exposure, and also suppress, for instance, generation of ghost images due to a history of the unnecessary exposure.

Further, in this image forming apparatus 2, as shown in FIGS. 8 and 9, the moving mechanism 270 performs two switching operations, i.e., an operation of switching between opening and closing of each of the optical paths R1Y, R1M, R1C, and R1K, and an operation of switching between a contact state where the developing roller 60 of each of the developing units 206Y, 206M, 206C, and 206K is in contact with a corresponding one of the photoconductive bodies 5Y, 5M, 5C, and 5K, and a separated state where the said developing roller 60 is separated from the corresponding one of the photoconductive bodies 5Y, 5M, 5C, and 5K. Thus, it is possible to reduce the number of parts included in the image forming apparatus 2 and achieve a simplified configuration of the image forming apparatus 2.

Further, in the image forming apparatus 2, before beginning to drive and rotate the polygon mirror 89P of the deflector 89, the controller 10 causes the moving mechanism 270 to move the developing units 206Y, 206M, 206C, and 206K to the respective separated positions, thereby closing the optical path R1Y of the light beam B1Y. Thus, even though the light source 4Y is caused to emit the light beam B1Y immediately after the polygon mirror 89P of the deflector 89 begins to be driven to rotate, the image forming apparatus 2 configured as above is enabled to certainly suppress unnecessary exposure of the photoconductive body 5Y.

Further, the image forming apparatus 2 is configured to rotate the developing units 206Y, 206M, 206C, and 206K, thereby opening and closing the optical paths R1Y, R1M, R1C, and R1K, respectively. Thus, it is possible to achieve a simplified configuration of the image forming apparatus 2 in which the process cartridges 230Y, 230M, 230C, and 230K support the developing units 206Y, 206M, 206C, and 206K, respectively.

Further, in the image forming apparatus 2, the optical sensor 8S is disposed in a position to detect the light beam B1Y deflected by the deflector 89. Namely, even in the image forming apparatus 2 configured to form images of a plurality of colors, only the single optical sensor 8S needs to be provided for the light beam B1Y corresponding to the particular color.

Further, in the image forming apparatus 2, the controller 10 causes the sheet conveyor 20 to start conveying the sheet SH, and then causes the moving mechanism 270 to move the developing units 206Y, 206M, 206C, 206K from the respective separated positions shown in FIG. 8 to the respective contact positions shown in FIG. 9, thereby opening the optical paths R1Y, R1M, and R1C. Then, the controller 10 transfers the developer onto the sheet SH being conveyed by the sheet conveyor 20, by the conveying belt 26 and the four transfer rollers 25. Thereby, the image forming apparatus 2 configured as above is enabled to place the developing units 206Y, 206M, 206C, and 206K in the respective separated positions until just before performing image formation on the sheet SH being conveyed by the sheet conveyor 20, thereby closing the optical path R1Y. Thus, it is possible to certainly suppress unnecessary exposure of the photoconductive body 5Y.

Further, in the image forming apparatus 2, the controller 10 controls the light source 4Y to emit the light beam B1Y after the rotational speed of the polygon mirror 89P of the deflector 89 reaches the particular rotational speed for imaging the light beams B1Y, B1M, B1C, and B1K onto the surfaces of the photoconductive bodies 5Y, 5M, 5C, and 5K. Therefore, it is possible to suppress unnecessary emission of the light beam B1Y from the light source 4Y.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

Modifications

In the aforementioned first and second illustrative embodiments, the optical sensor 8S is provided to detect the light beam B1Y. However, for instance, in a modification of the first illustrative embodiment, the optical sensor 8S may be provided to detect the light beam B1M, and the light path R1M may be closed by the developing unit 6C moved to the separated position. Further, in another instance, in a modification of the first illustrative embodiment, the optical sensor 8S may be provided to detect the light beam B1C, and the light path R1C may be closed by the developing unit 6K moved to the separated position. Further, in yet another instance, in a modification of the second illustrative embodiment, the optical sensor 8S may be provided to detect the light beam B1M, and the light path R1M may be closed by the developing unit 206M moved to the separated position. Further, in yet another instance, in a modification of the second illustrative embodiment, the optical sensor 8S may be provided to detect the light beam B1C, and the light path R1C may be closed by the developing unit 206C moved to the separated position. Further, in yet another instance, in a modification of the second illustrative embodiment, the optical sensor 8S may be provided to detect the light beam B1K, and the light path R1K may be closed by the developing unit 206K moved to the separated position.

In the aforementioned first illustrative embodiment, the deflector 89 begins to be driven in the state where the developing units 6Y, 6M, 6C, and 6K are in the respective separated positions, and the optical path R1Y is closed. However, for instance, in a modification of the first illustrative embodiment, after the deflector 89 begins to be driven, the developing units 6Y, 6M, 6C, and 6K may be moved to the respective separated positions. The same may apply to the second illustrative embodiment.

The following shows examples of associations between elements exemplified in the aforementioned illustrative embodiments and modifications and elements according to aspects of the present disclosure. The image forming apparatus 1 and the image forming apparatus 2 may be included in examples of an "image forming apparatus" according to aspects of the present disclosure. The photoconductive body 5Y may be an example of a "photoconductive body" according to aspects of the present disclosure, and may be an example of a "first photoconductive body" according to aspects of the present disclosure. The photoconductive body 5M may be an example of the "photoconductive body" according to aspects of the present disclosure, and may be an example of a "second photoconductive body" according to aspects of the present disclosure. The light source 4Y may be an example of a "light source" according to aspects of the present disclosure, and may be an example of a "first light source" according to aspects of the present disclosure. The light source 4M may be an example of the "light source" according to aspects of the present disclosure, and may be an example of a "second light source" according to aspects of the present disclosure. The light beam B1Y may be an example of a "light beam" according to aspects of the present disclosure, may be an example of a "particular light beam" according to aspects of the present disclosure, and may be an example of a "first light beam" according to aspects of the present disclosure. The light beam B1M may be an example of the "light beam" according to aspects of the present disclosure, and may be an example of a "second light beam" according to aspects of the present disclosure. The deflector 89 may be an example of a "deflector" according to aspects of the present disclosure. The scanning optical system 80 may be an example of a "scanning optical system" according to aspects of the present disclosure. The developing unit 206Y may be an example of a "developing unit" according to aspects of the present disclosure. The developing unit 6Y may be an example of a "first developing unit" according to aspects of the present disclosure. The developing unit 6M may be an example of a "second developing unit" according to aspects of the present disclosure. The developing roller 60 of the developing unit 206Y may be an example of a "developing roller" according to aspects of the present disclosure. The developing roller 60 of the developing unit 6Y may be an example of a "first developing roller" according to aspects of the present disclosure. The developing roller 60 of the developing unit 6M may be an example of a "second developing roller" according to aspects of the present disclosure. The optical sensor 8S may be an example of an "optical sensor" according to aspects of the present disclosure. The moving mechanism 70 and the moving mechanism 270 may be included in examples of a "moving mechanism" according to aspects of the present disclosure. The contact position of the developing unit 6M and the contact position of the developing unit 206Y may be included in examples of a "first position" according to aspects of the present disclosure. The optical path R1Y may be an example of an "optical path" of the "light beam" according to aspects of the present disclosure, and may be an example of an "optical path" of the "first light beam" according to aspects of the present disclosure. The separated position of the developing unit 6M and the separated position of the developing unit 206Y may be included in examples of a "second position" according to aspects of the present disclosure. The controller 10 may be an example of a "controller" according to aspects of the present disclosure. The sheet conveyor 20 may be an example of a "sheet conveyor" according to aspects of the present disclosure. The four transfer rollers 25 and the conveying belt 26 may be included in a "transfer device" according to aspects of the present disclosure. The guide surfaces 8G may be included in examples of a "guide" according to aspects of the present disclosure. The central axis of each rotary member 206G may be an example of a "particular axis" according to aspects of the present disclosure. The compression coil springs 79 and 279 may be included in examples of a "spring" according to aspects of the present disclosure. The cams 71 may be included in examples of a "cam" according to aspects of the present disclosure. The pressed members 75 may be included in examples of a "pressed member" according to aspects of the present disclosure.

What is claimed is:

1. An image forming apparatus comprising:
a photoconductive body;
a light source configured to emit a light beam;
a deflector including a polygon mirror, the deflector being configured to deflect the light beam emitted by the light source and scan the light beam in a scanning direction;
a scanning optical system configured to image the light beam deflected by the deflector onto the photoconductive body;
a developing unit including a developing roller configured to supply developer to the photoconductive body;
an optical sensor configured to detect the light beam deflected by the deflector;
a cam configured to press the developing unit and move the developing unit to a first position where an optical path of the light beam from the scanning optical system to the photoconductive body is opened, and to a second position where the optical path is closed by a wall of the developing unit; and
a controller configured to:
when receiving a command to perform image formation, start driving the deflector;
after receiving the command to perform image formation and starting driving the deflector, when the developing unit is in the second position, cause the light source to continuously emit the light beam over an area of a single surface of the polygon mirror including an exposure scanning range in the scanning direction within which the photoconductive body is exposed to the light beam, thereby obtaining a detection signal of the light beam from the optical sensor; and
after obtaining the detection signal, control the light source to emit the light beam only within a particular range outside the exposure scanning range in the scanning direction, and thereafter control the cam to move the developing unit to the first position.

2. The image forming apparatus according to claim 1,
wherein the developing roller is configured to:
be in contact with the photoconductive body when the developing unit is in the first position; and
be separated from the photoconductive body when the developing unit is in the second position.

3. The image forming apparatus according to claim 1,
wherein the controller is further configured to, before starting driving the deflector, control the cam to move the developing unit to the second position.

4. The image forming apparatus according to claim 1, further comprising a guide configured to guide the developing unit,
wherein the developing unit is configured to move between the first position and the second position while being guided by the guide.

5. The image forming apparatus according to claim 1,
wherein the developing unit is configured to move between the first position and the second position while rotating around a particular axis.

6. The image forming apparatus according to claim 1, further comprising a spring configured to press the developing unit toward the photoconductive body,
wherein the cam is further configured to move the developing unit to the second position against a pressing force from the spring.

7. The image forming apparatus according to claim 6,
wherein the developing unit comprises a pressed member configured to be pressed by the cam, and
wherein movement of the cam causes movement of the developing unit to the second position against the pressing force from the spring.

8. The image forming apparatus according to claim 1, further comprising:

a plurality of photoconductive bodies including the said photoconductive body;

a plurality of light sources including the said light source; and a plurality of developing units including the said developing unit, wherein the deflector is further configured to deflect a plurality of light beams emitted by the plurality of light sources, respectively, wherein the scanning optical system is further configured to image the plurality of light beams deflected by the deflector onto the plurality of photoconductive bodies, respectively, and wherein the optical sensor is positioned to detect a particular light beam deflected by the deflector, the particular light beam being, after deflected by the deflector, imaged by the scanning optical system onto a particular one of the plurality of photoconductive bodies.

9. The image forming apparatus according to claim 1, further comprising:

a sheet conveyor configured to convey a sheet; and a transfer device configured to transfer the developer on the photoconductive body onto the sheet, wherein the controller is further configured to, after starting conveying the sheet by the sheet conveyor, control the cam to allow movement of the developing unit from the second position to the first position, and cause the transfer device to transfer the developer onto the sheet being conveyed by the sheet conveyor.

10. The image forming apparatus according to claim 1, wherein the deflector includes a polygon mirror configured to rotate to deflect the light beam emitted by the light source, and wherein the controller is further configured to control the light source to emit the light beam after a rotational speed of the polygon mirror reaches a particular rotational speed for imaging the light beam onto the photoconductive body.

11. An image forming apparatus comprising:

a first photoconductive body;

a second photoconductive body disposed adjacent to the first photoconductive body along a direction perpendicular to an axial direction of the first photoconductive body and the second photoconductive body;

a first light source configured to emit a first light beam;

a second light source configured to emit a second light beam;

a deflector configured to deflect the first light beam emitted by the first light source and the second light beam emitted by the second light source;

a scanning optical system configured to image the first light beam deflected by the deflector onto the first photoconductive body, and image the second light beam deflected by the deflector onto the second photoconductive body;

a first developing unit including a first developing roller configured to supply developer to the first photoconductive body;

a second developing unit including a second developing roller configured to supply developer to the second photoconductive body;

an optical sensor configured to detect the first light beam deflected by the deflector;

a cam configured to press the second developing unit and move the second developing unit to a first position where an optical path of the first light beam from the scanning optical system to the first photoconductive body is opened, and to a second position where the optical path is closed by the second developing unit; and a controller configured to:

start driving the deflector;

when the second developing unit is in the second position to close the optical path, cause the first light source to emit the first light beam, thereby obtaining a detection signal of the first light beam from the optical sensor; and after obtaining the detecting signal, control the cam to move the second developing unit to the first position, thereby keeping the second developing unit from closing the optical path.

12. The image forming apparatus according to claim 11, wherein the second developing roller is configured to:

be in contact with the second photoconductive body when the second developing unit is in the first position; and be separated from the second photoconductive body when the second developing unit is in the second position.

13. The image forming apparatus according to claim 11, wherein the controller is further configured to, before starting driving the deflector, cause movement of the cam to move the second developing unit to the second position.

14. The image forming apparatus according to claim 11, wherein the controller is further configured to, after obtaining the detection signal, control the first light source to emit the first light beam only within a particular range in a scanning direction in which the first light beam is scanned by the deflector, the particular range including a range in which the optical sensor detects the first light beam, the particular range being outside an exposure scanning range in which the first photoconductive body is exposed to the first light beam.

15. The image forming apparatus according to claim 11, further comprising a guide configured to guide the second developing unit, wherein the second developing unit is configured to move between the first position and the second position while being guided by the guide.

16. The image forming apparatus according to claim 11, wherein the deflector includes a polygon mirror, the deflector being further configured to scan the light beam in a scanning direction;

wherein the optical path is closed by a wall of the second developing unit;

wherein the controller is configured to start driving the deflector when receiving a command to perform image formation, and wherein the controller is further configured to:

when the second developing unit is in the second position, cause the first light source to emit the first light beam over an area of a single surface of the polygon mirror including an exposure scanning range in the scanning direction within which the first photoconductive body is exposed to the first light beam to thereby obtain the detection signal of the first light beam from the optical sensor; and after obtaining the detection signal, control the first light source to emit the first light beam only within a particular range outside the exposure scanning range in the scanning direction prior to controlling the cam to move the second developing unit to the first position.

17. An image forming apparatus comprising:

a photoconductive body;

a drawer configured to support the photoconductive body and to be pulled out in a direction perpendicular to an axial direction of the photoconductive body;

a light source configured to emit a light beam;

a deflector configured to deflect the light beam emitted by the light source, the deflector including a polygon mirror and being configured to scan the light beam in a scanning direction;

a scanning optical system configured to image the light beam deflected by the deflector onto the photoconductive body;

a developing unit including a developing roller configured to supply developer to the photoconductive body, the developing roller being configured to be in contact with the photoconductive body when the developing unit is in the first position, and be separated from the photoconductive body when the developing unit is in the second position;

an optical sensor configured to detect the light beam deflected by the deflector;

a cam configured to press the developing unit and move the developing unit to a first position where an optical path of the light beam from the scanning optical system to the photoconductive body is opened, and to a second position where the optical path is closed by a wall of the developing unit, the developing unit being movable from the first position toward the second position relative to the photoconductive body in a movement direction; and a controller configured to:

start driving the deflector;

when the developing unit is in the second position, to close the optical path by the wall of the developing unit by movement of the wall in the movement direction, cause the light source to emit the light beam, thereby obtaining a detection signal of the light beam from the optical sensor; and after obtaining the detection signal, control movement of the cam to move the developing unit to the first position, thereby keeping the developing unit from closing the optical path by the wall thereof.

* * * * *